(12) United States Patent
Dines

(10) Patent No.: US 11,740,990 B2
(45) Date of Patent: *Aug. 29, 2023

(54) AUTOMATION OF A PROCESS RUNNING IN A FIRST SESSION VIA A ROBOTIC PROCESS AUTOMATION ROBOT RUNNING IN A SECOND SESSION

(71) Applicant: UiPath, Inc., New York, NY (US)

(72) Inventor: Daniel Dines, New York, NY (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,238

(22) Filed: Jul. 18, 2022

(65) Prior Publication Data

US 2022/0350723 A1 Nov. 3, 2022

Related U.S. Application Data

(63) Continuation of application No. 16/925,544, filed on Jul. 10, 2020, now Pat. No. 11,392,477, which is a (Continued)

(51) Int. Cl.
*G06F 15/16* (2006.01)
*G06F 11/34* (2006.01)

(52) U.S. Cl.
CPC ...... *G06F 11/3409* (2013.01); *G06F 11/3476* (2013.01)

(58) Field of Classification Search
CPC .............. G06F 11/3409; G06F 11/3476; G06F 11/302; G06F 11/3006
See application file for complete search history.

(56) References Cited

U.S. PATENT DOCUMENTS 7,013,465 B1 3/2006 Taylor et al.
7,080,385 B1 * 7/2006 Collison ................. G06F 9/542
719/310

(Continued)

FOREIGN PATENT DOCUMENTS

CN 102473106 B 4/2015
CN 107666987 A 2/2018
(Continued)

OTHER PUBLICATIONS

Notice of Allowance issued in Korean Application No. 10-2020-7028231 dated Nov. 4, 2022.

(Continued)

*Primary Examiner* — Kevin L Young
*Assistant Examiner* — Abdou K Seye
(74) *Attorney, Agent, or Firm* — LeonardPatel PC; Michael Aristo Leonard, II; Sheetal Suresh Patel

(57) ABSTRACT

Automation of a process running in a first session via robotic process automation (RPA) robot(s) running in a second session is disclosed. In some aspects, a form is displayed in a user session, but one or more attended RPA robots that retrieve and/or interact with data for an application in the first session run in one or more other sessions. In this manner, the operation of the RPA robot(s) may not prevent the user from using other applications or instances when the RPA robot(s) are running, but the data modifications made or facilitated by the RPA robot(s) may be visible to the user in the first session window.

24 Claims, 27 Drawing Sheets

Related U.S. Application Data continuation of application No. 16/924,910, filed on Jul. 9, 2020, now Pat. No. 11,157,339.

(56) References Cited

U.S. PATENT DOCUMENTS

| | | | |
|---|---|---|---|
| 7,478,402 B2 * | 1/2009 | Christensen | G06F 9/546 |
| | | | 709/231 |
| 7,899,915 B2 | 3/2011 | Reisman | |
| 8,402,431 B2 | 3/2013 | DeBoer et al. | |
| 9,552,056 B1 | 1/2017 | Barry et al. | |
| 10,324,457 B2 | 6/2019 | Neelakandan et al. | |
| 10,339,027 B2 | 7/2019 | Garcia et al. | |
| 10,503,627 B2 | 12/2019 | Radhakrishnan et al. | |
| 10,572,316 B2 | 2/2020 | Carteri et al. | |
| 10,654,166 B1 | 5/2020 | Hall | |
| 10,860,905 B1 | 12/2020 | Gligan et al. | |
| 10,911,546 B1 * | 2/2021 | Goswami | H04L 67/141 |
| 11,117,259 B2 | 9/2021 | Hall | |
| 11,130,233 B2 | 9/2021 | Hall | |
| 11,157,339 B1 | 10/2021 | Dines | |
| 11,233,861 B2 | 1/2022 | Hall et al. | |
| 11,325,254 B2 | 5/2022 | Hall | |
| 11,366,644 B1 | 6/2022 | Krebs et al. | |
| 2002/0105296 A1 | 8/2002 | Okuyama et al. | |
| 2003/0191559 A1 | 10/2003 | Chatsinchai et al. | |
| 2004/0015266 A1 | 1/2004 | Skoog | |
| 2005/0262052 A1 | 11/2005 | Daniels et al. | |
| 2006/0184293 A1 | 8/2006 | Konandreas et al. | |
| 2009/0064177 A1 * | 3/2009 | Bauer | G06F 9/544 |
| | | | 719/313 |
| 2010/0076600 A1 | 3/2010 | Cross et al. | |
| 2012/0331404 A1 | 12/2012 | Buford et al. | |
| 2013/0297678 A1 | 11/2013 | Schach et al. | |
| 2015/0363224 A1 | 12/2015 | Argenti et al. | |
| 2016/0259651 A1 | 9/2016 | Nychis et al. | |
| 2016/0259655 A1 | 9/2016 | Nychis et al. | |
| 2016/0288322 A1 | 10/2016 | Lin et al. | |
| 2017/0052824 A1 | 2/2017 | Sharma et al. | |
| 2017/0076194 A1 | 3/2017 | Versace et al. | |
| 2017/0295243 A1 * | 10/2017 | Kim | H04L 67/131 |
| 2018/0074931 A1 | 3/2018 | Garcia et al. | |
| 2018/0121217 A1 | 5/2018 | Jarabek et al. | |
| 2018/0197123 A1 | 7/2018 | Parimelazhagan et al. | |
| 2018/0370033 A1 | 12/2018 | Geffen et al. | |
| 2019/0004932 A1 | 1/2019 | Misra et al. | |
| 2019/0022856 A1 | 1/2019 | Küllang | |
| 2019/0122200 A1 | 4/2019 | Kurian | |
| 2019/0129824 A1 | 5/2019 | Radhakrishnan et al. | |
| 2019/0130094 A1 | 5/2019 | Votaw et al. | |
| 2019/0132229 A1 | 5/2019 | McCormack et al. | |
| 2019/0138600 A1 | 5/2019 | Krishnan et al. | |
| 2019/0155225 A1 | 5/2019 | Kothandaraman et al. | |
| 2019/0171845 A1 | 6/2019 | Dotan-Cohen et al. | |
| 2019/0215283 A1 | 7/2019 | Nahum et al. | |
| 2019/0303779 A1 | 10/2019 | Briggle et al. | |
| 2020/0001471 A1 | 1/2020 | Chen et al. | |
| 2020/0004798 A1 | 1/2020 | Weinert, Jr. et al. | |
| 2020/0019283 A1 | 1/2020 | Nychis et al. | |
| 2020/0147791 A1 | 5/2020 | Safary et al. | |
| 2020/0180155 A1 | 6/2020 | Hall | |
| 2020/0213422 A1 | 7/2020 | Pandya et al. | |
| 2020/0348654 A1 | 11/2020 | Anand et al. | |
| 2020/0348960 A1 | 11/2020 | Krishnamurthy et al. | |
| 2020/0348964 A1 | 11/2020 | Anand et al. | |
| 2020/0356395 A1 | 11/2020 | Deng et al. | |
| 2021/0042338 A1 | 2/2021 | Smutko et al. | |
| 2021/0086354 A1 | 3/2021 | Berg et al. | |
| 2021/0109717 A1 | 4/2021 | Voicu et al. | |
| 2021/0125025 A1 | 4/2021 | Kuo et al. | |
| 2021/0129325 A1 | 5/2021 | Yu et al. | |
| 2021/0146537 A1 | 5/2021 | Bannoura | |
| 2021/0252703 A1 | 8/2021 | Hall | |
| 2021/0258389 A1 | 8/2021 | Hall et al. | |
| 2022/0011732 A1 | 1/2022 | Hall | |
| 2022/0012152 A1 | 1/2022 | Dines | |
| 2022/0070246 A1 | 3/2022 | Ripa | |

FOREIGN PATENT DOCUMENTS

| | | |
|---|---|---|
| CN | 109074402 A | 12/2018 |
| CN | 109118347 A | 1/2019 |
| CN | 109636504 A | 4/2019 |
| CN | 201910345536 A | 7/2019 |
| CN | 110286998 A | 9/2019 |
| CN | 110648054 A | 1/2020 |
| JP | 2006000954 A | 1/2006 |
| JP | 5607741 B2 | 10/2014 |
| JP | 2018535459 A | 11/2018 |
| JP | 6532626 B1 | 6/2019 |
| JP | 2019159556 A | 9/2019 |
| JP | 2019169044 A | 10/2019 |
| JP | 2020003905 A | 1/2020 |
| JP | 202000017099 | 1/2020 |
| JP | 2020092400 A | 6/2020 |
| KR | 1020180123513 A | 11/2018 |
| WO | 2017176917 A1 | 10/2017 |
| WO | 2021167644 A1 | 8/2021 |

OTHER PUBLICATIONS

Notification of Reasons for Refusal issued in Japanese Application No. 2020-553457 dated Nov. 4, 2022.
U.S. Appl. No. 15/930,906, filed May 13, 2020, Andrew Hall.
U.S. Appl. No. 16/874,593, filed May 14, 2020, Andrew Hall.
U.S. Appl. No. 16/924,910, filed Jul. 9, 2020, Daniel Dines.
U.S. Appl. No. 16/925,544, filed Jul. 10, 2020, Daniel Dines.
U.S. Appl. No. 16/989,003, filed Aug. 10, 2020, Andrew Hall.
U.S. Appl. No. 16/989,064, filed Aug. 10, 2020, Andrew Hall.
"17th Annual Meeting in Shimane Prefectural CIO Forum RPA Technologies Autonomy Introducing RPA that succeeds with the body Why is it easy to deploy horizontally even at a small start?," Nikkei BP Government Technology, Fall 2019 (No. 40), Nikkei BP, pp. 32 and 33 (Oct. 2019).
"About Session 0", Teratail [online], Leverages Co., Ltd., 201 Aug. 6, 2006, [search on Jul. 21, 3rd year of Reiwa], https://teratail.com/questions/6404.
"Connecting to a Console Session with Windows Remote Desktop", Tech TIPS-@IT, [online], ITmedia, Inc., Apr. 10, 2009 [Jul. 21, Reiwa 3], https://www.atmarkit.co.jp/ait/articles/0501/15/news014.html.
"Robotic Desktop Automation in 2021: In-depth Guide," available at https://research.aimultiple.com/rda/ (last accessed Mar. 22, 2021).
"Robotic process automation in a virtual environment," available at https://www.pwc.in/assets/pdfs/publications/2018/robotic-process-automation-in-a-virtual-environment.pdf (last accessed Mar. 22, 2021).
"Run robot scripts in separate 'Sessions'" question page available at https://github.com/damies13/rfswarm/issues/61 (Jan. 10, 2020).
"Special feature RPA maxim 3 Forefront of tools and technology 5 maxims to prevent failure It's not dangerous if you know the rules," Nikkei Computer, Issue No. 979, Nikkei BP, pp. 32 and 33, ISSN 0285-4619 (Dec. 6, 2018).
"Special feature: Production RPA 2 Tool enhancement 3 selection points," Nikkei Computer Data, issue No. 952, Nikkei BP, pp. 30-33, ISSN: 0285-4619 (Nov. 23, 2017).
"Unpacking the Intelligent Technology Powering NEVA (NICE Employee Virtual Attendant," available at https://www.icsanalytics.com/wp-content/uploads/2018/10/NICE-Desktop-Automation-Whitepaper-ICS-Analytics.pdf (Oct. 1, 2018).
Abdou K Seye, "Final Office Action", dated Mar. 26, 2021, U.S. Appl. No. 16/924,910.
Abdou K Seye, "Non-Final Office Action", dated Nov. 6, 2020, U.S. Appl. No. 16/924,910.
Abdou K Seye, "Notice of Allowance", dated May 20, 2022, U.S. Appl. No. 16/925,544.
Abdou K Seye, "Notice of Allowance", dated Sep. 15, 2021, U.S. Appl. No. 16/924,910.

(56) References Cited

OTHER PUBLICATIONS

AI Multiple Robotic Desktop Automation Guide available at https://blog.aimultiple.com/rda/ (Jan. 1, 2020).
Anagnoste, Sorin, "Robotic Automation Process—The Operating System for the Digital Enterprise", 2018.
Brugali, et al. "Distributed Computing in Robotics and Automation", 2002.
Chacon-Montero, et al. "Towards a Method for Automated Testing in Robotic Process Automation Projects", 2019.
Cristina-Claudia Osman, Robotic Process Automation: Lessons Learned from Case Studies. (Year: 2019).
David Gauthier, et al. "Interprocess Communication for Distributed Robotics", (Year: 1987).
Embedding Remote Desktop ActiveX Control in a Webpage page available at https://docs.microsoft.com/en-us/windows/win32/termserv/embedding-the-remote-desktop-activex-control-in-a-web-page (last accessed Jan. 21, 2022).
European Search Report issued in EP Application No. 20199147 dated Mar. 11, 2021.
European Search Report issued in EP Application No. 20199191 dated Mar. 12, 2021.
Examination Report issued in EP Application No. 20197271.8 dated Mar. 25, 2021.
Gauthier, et al., "Interprocess Communication for Distributed Robotics", 1987.
ICS Analytics NICE Desktop Automation Whitepaper available at https://www.icsanalytics.com/wp-content/uploads/2018/10/NICE-Desktop-Automation-Whitepaper-ICS-Analytics.pdf (last accessed Feb. 18, 2020).
Inter-Bot Communication / Delegation Guide available at https://botpress.com/docs/tutorials/interbot (last accessed May 11, 2020).
International Search Report & Written Opinion, dated Apr. 1, 2021, PCT Application No. PCT/US20/63951.
International Search Report & Written Opinion, dated Apr. 8, 2021, PCT Application No. PCT/US20/51940.
International Search Report & Written Opinion, PCT Application No. PCT/US20/63964.
International Search Report and Written Opinion of the International Search Authority issued for PCT Application No. PCT/US2020/063912 dated Mar. 18, 2021.
International Search Report and Written Opinion of the International Search Authority issued for PCT Application No. PCT/US2020/063921 dated Mar. 18, 2021.
International Search Report and Written Opinion of the International Search Authority issued in PCT Application No. PCT/US2020/039886 dated Nov. 6, 2020.
International Search Report and Written Opinion of the International Search Authority issued in PCT Application No. PCT/US2020/051938 dated Mar. 26, 2021.
Jennifer L. Casper, Workflow Study on Human-Robot Interaction in USAR. (Year: 2002).
Kenichi Kawai, "Introduction to OS / 2," First Edition, Baifukan Co., Ltd., pp. 144-152, ISBN: 4-563-01340-4 (Jun. 30, 1988).
Lechi Truong, "Non-Final Office Action", dated Apr. 15, 2021, U.S. Appl. No. 16/874,593.
Lechi Truong, "Non-Final Office Action", dated Jun. 24, 2021, U.S. Appl. No. 15/930,906.
Lechi Truong, "Non-Final Office Action", dated Oct. 28, 2021, U.S. Appl. No. 16/989,003.
Lechi Truong, "Notice of Allowance", dated Apr. 13, 2020, U.S. Appl. No. 16/793,064.
Lechi Truong, "Notice of Allowance", dated Aug. 2, 2021, U.S. Appl. No. 16/989,064.
Lechi Truong, "Notice of Allowance", dated Jul. 29, 2021, U.S. Appl. No. 16/874,593.
Lechi Truong, "Notice of Allowance", dated Mar. 23, 2022, U.S. Appl. No. 16/989,003.
Lechi Truong, "Notice of Allowance", dated Nov. 26, 2021, U.S. Appl. No. 15/930,906.
Michele Amoretti et al., "Architectural paradigms for robotics applications," Advanced Engineering Informatics, vol. 24, No. 1, pp. 4-13 (Jan. 1, 2010).
Microfocus RPA Architecture page available at https://docs.microfocus.com/itom/Robotic_Process_Automation:2019.07/RPAArch> (last accessed Dec. 30, 2020).
Microsoft Child Sessions documentation page available at https://docs.microsoft.com/en-us/windows/win32/termserv/child-sessions (May 31, 2018).
NICE RPA brochure available at https://www.nice.com/rpa/assets/NICE_Advanced_Process_Automation-Brochure_2018.pdf (last accessed May 11, 2020).
NICE RPA chatbot page available at https://www.nice.com/engage/blog/chatbots--robotic-automation--a-match-made-in-heaven-2315/ (last accessed May 11, 2020).
NICE RPA page available at https://www.nice.com/rpa/robotic-automation/ (last accessed Jun. 15, 2020).
Notice of Allowance issued in Japanese Patent Application No. 2020-125401 dated Aug. 4, 2021.
Lechi Truong, "Non-Final Office Action", dated Mar. 16, 2023, U.S. Appl. No. 17/583,044.
Notification of Reasons for Refusal issued in Japanese Application No. 2020-553457 dated Apr. 10, 2023.
Reddy, et al., "A Study of Robotic Process Automation Among Artificial Intelligence", International Journal of Scientific and Research Publications, vol. 9, Issue 2, Feb. 2019.
Second Office Action issued in Chinese Application No. 202080002309.8 dated Jan. 20, 2023.
Notice of Allowance issued in Korean Application No. 10-2020-0101943 dated Dec. 23, 2020.
Notice of Allowance issued in Taiwanese Application No. 109124314 dated May 4, 2021.
Notice of Allowance issued in Taiwanese Application No. 109133853 dated Apr. 27, 2022.
Notice of Allowance issued in Taiwanese Patent Application No. 109133853 dated Apr. 27, 2022.
Notification of Reasons for Refusal issued in Japanese Patent Application No. 2020-125401 dated Dec. 15, 2020.
Office Action issued in Chinese Application No. 202010894023.7 dated Feb. 8, 2022.
Office Action received in European Application No. 20197271.8 dated Jun. 10, 2022.
Official Letter and Search Report issued by the Taiwan Intellectual Property Office (TIPO) dated Jan. 29, 2021.
Pall Jensson, "Robotic Process Automation: Dynamic Roadmap for Successful Implementation" (2018).
PWC Robotic Process Automation in a Virtual Environment brochure available at https://www.pwc.in/assets/pdfs/publications/2018/robotic-process-automation-in-a-virtual-environment.pdf (May 2018).
Quang-Vinh Dang, Scheduling a single mobile robot for part-feeding tasks of production lines. (Year: 2014).
Radoslaw Dukalski, Portable rapid visual workflow simulation tool for human robot coproduction. (Year: 2017).
Remote Desktop ActiveX Control Classes Page available at https://docs.microsoft.com/en-us/windows/win32/termserv/remote-desktop-activex-control-classes (last accessed Jan. 20, 2022).
Remote Desktop ActiveX Control Classes page available at https://docs.microsoft.com/en-us/windows/win32/termserv/remote-desktop-activex-control-classes (last accessed Jan. 21, 2022).
Search Report issued in Chinese Application No. 202010894023.7 dated Feb. 8, 2022.
Shinichi Hoshi, "Let's Warp, OS / 2 Programming 3rd Multitasking System's Interprocess Communication," DDJ (Dr. Dobb's Journal Japan), Shoeisha Co., Ltd., pp. 170-176 (Jul. 1, 1995).
Solomiya Yatskiv, Improved Method of Software Automation Testing Based on the Robotic Process Automation Technology. (Year: 2019).
Sumi Takano, "How to create a parallel program in OS / 2 (I)," Information Processing, vol. 31, No. 10, Information Processing Society of Japan, pp. 1425-1432, ISS: 0447-8053 (Oct. 15, 1990).
Supplementary European Search Report issued for EP Application No. 20197271.8 dated Feb. 26, 2021.

(56) References Cited

OTHER PUBLICATIONS

UiPath Extension for Windows Remote Desktop page available at https://docs.uipath.com/studio/docs/extension-for-windows-remote-desktop (last accessed Feb. 14, 2020).
UiPath Robot Agent documentation available at https://docs.uipath.com/robot/docs/robot-agent (last accessed Feb. 14, 2020).
Windows Remote Desktop Services roles page available at https://docs.microsoft.com/en-us/windows-server/remote/remote-desktop-services/rds-roles (last accessed Jan. 20, 2022).
First Office Action issued in Chinese Application No. 202080002309.8 dated Aug. 1, 2022.
Notice of Allowance issued in Chinese Application No. 202010894023.7 dated Jul. 4, 2022.
Notice of Allowance issued in Korean Application No. 10-2020-7028190 dated Aug. 27, 2022.

\* cited by examiner

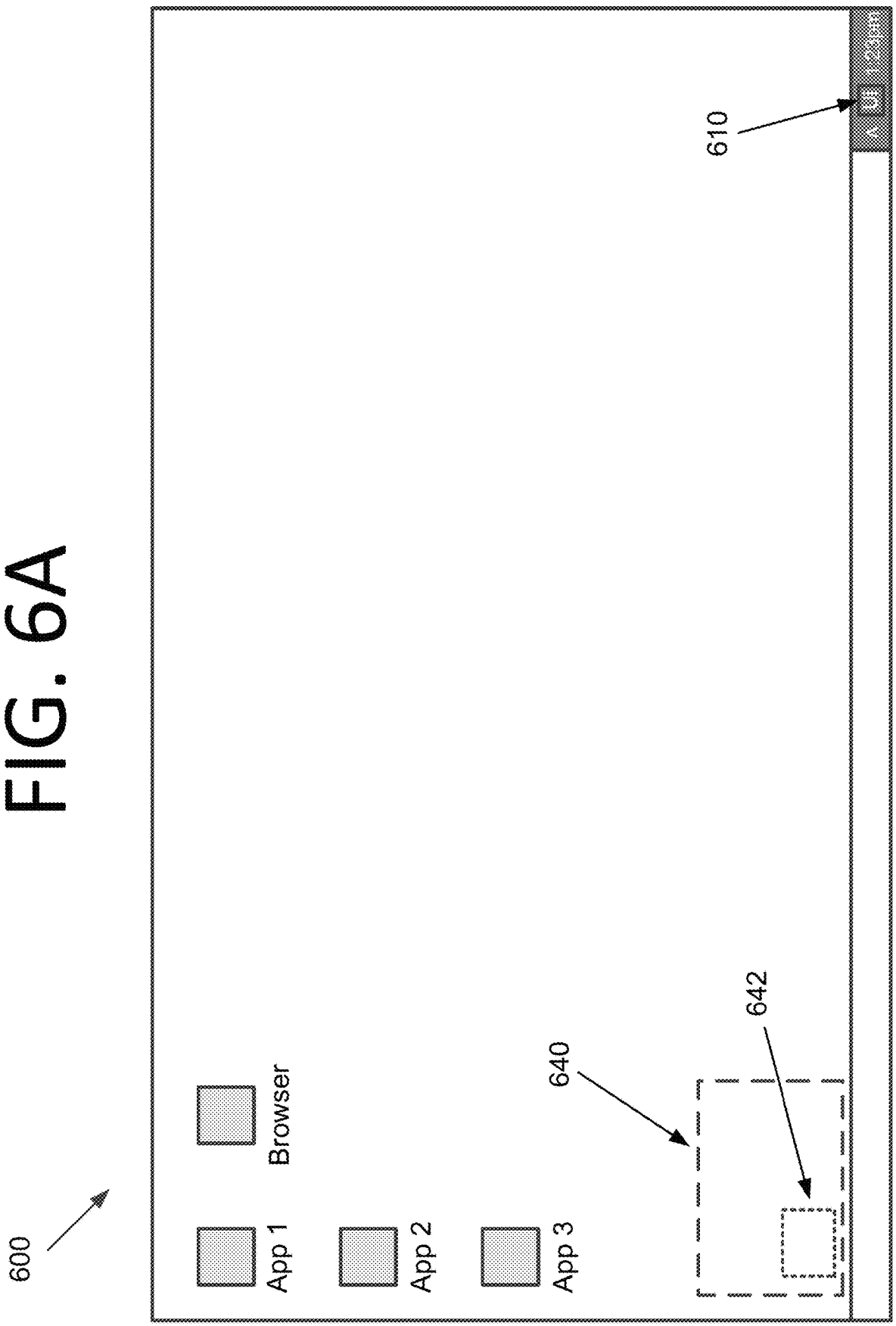

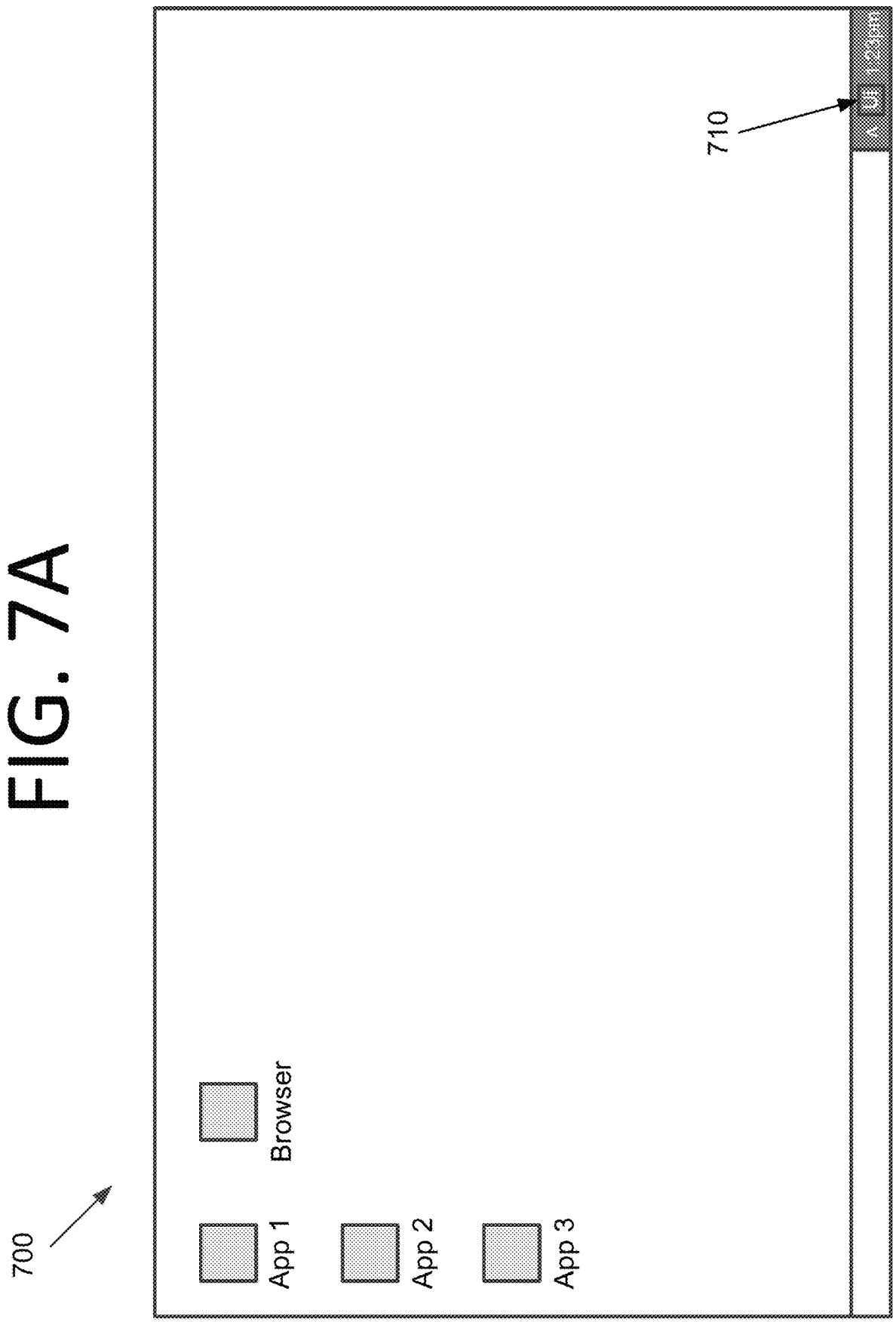

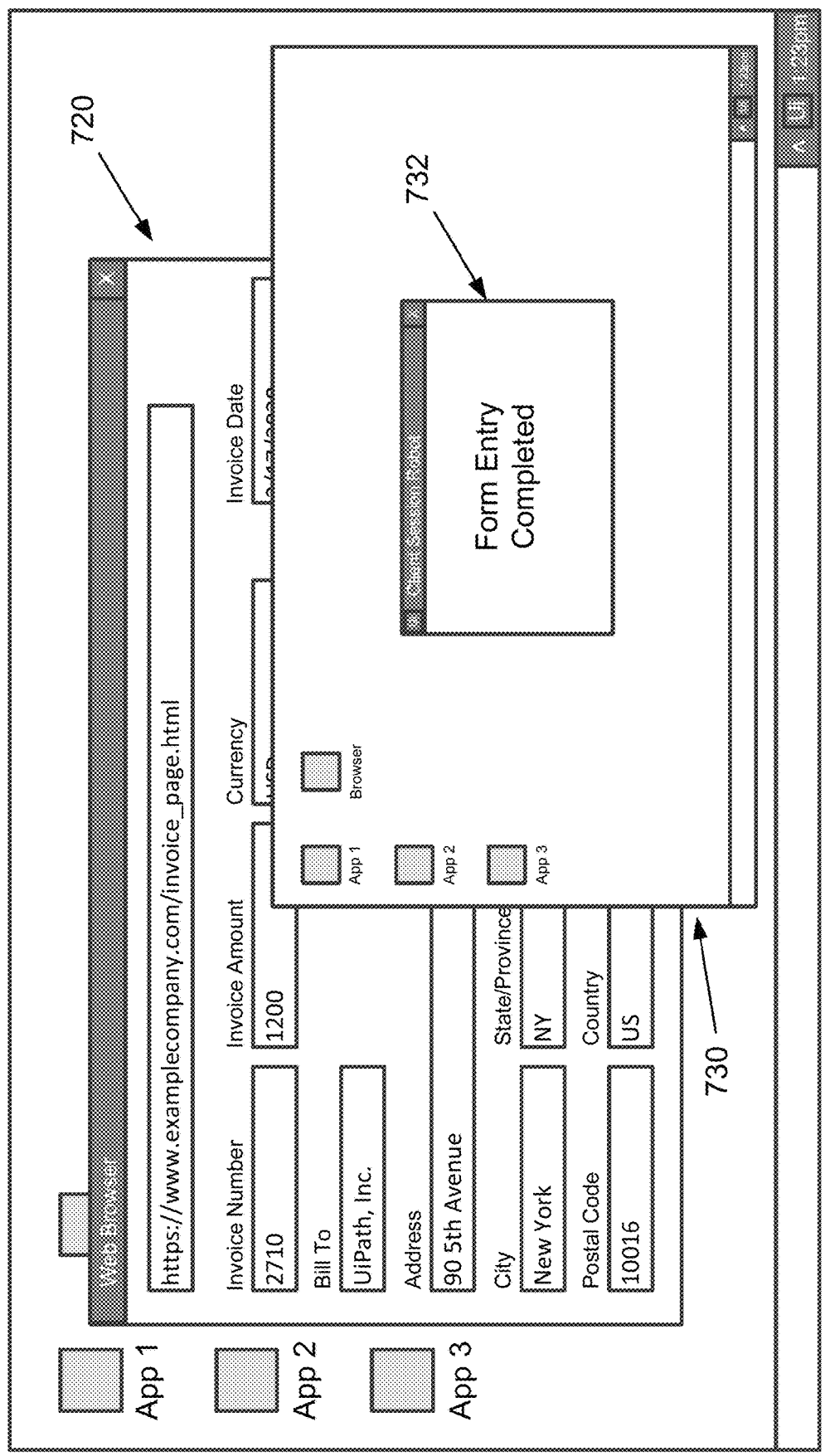

Web Browser
https://www.examplecompany.com/invoice_page.html

| Invoice Number | Invoice Amount | Currency |
| --- | --- | --- |
| 2710 | 1200 | USD |

Bill To
UiPath, Inc.

Address
90 5th Avenue

| Invoice Date |
| --- |
| 3/17/2020 |

| Due Date |
| --- |
| 4/17/2020 |

| City | State/Province |
| --- | --- |
| New York | NY |

| Postal Code | Country |
| --- | --- |
| 10016 | US |

Submit

App 1  App 2  App 3

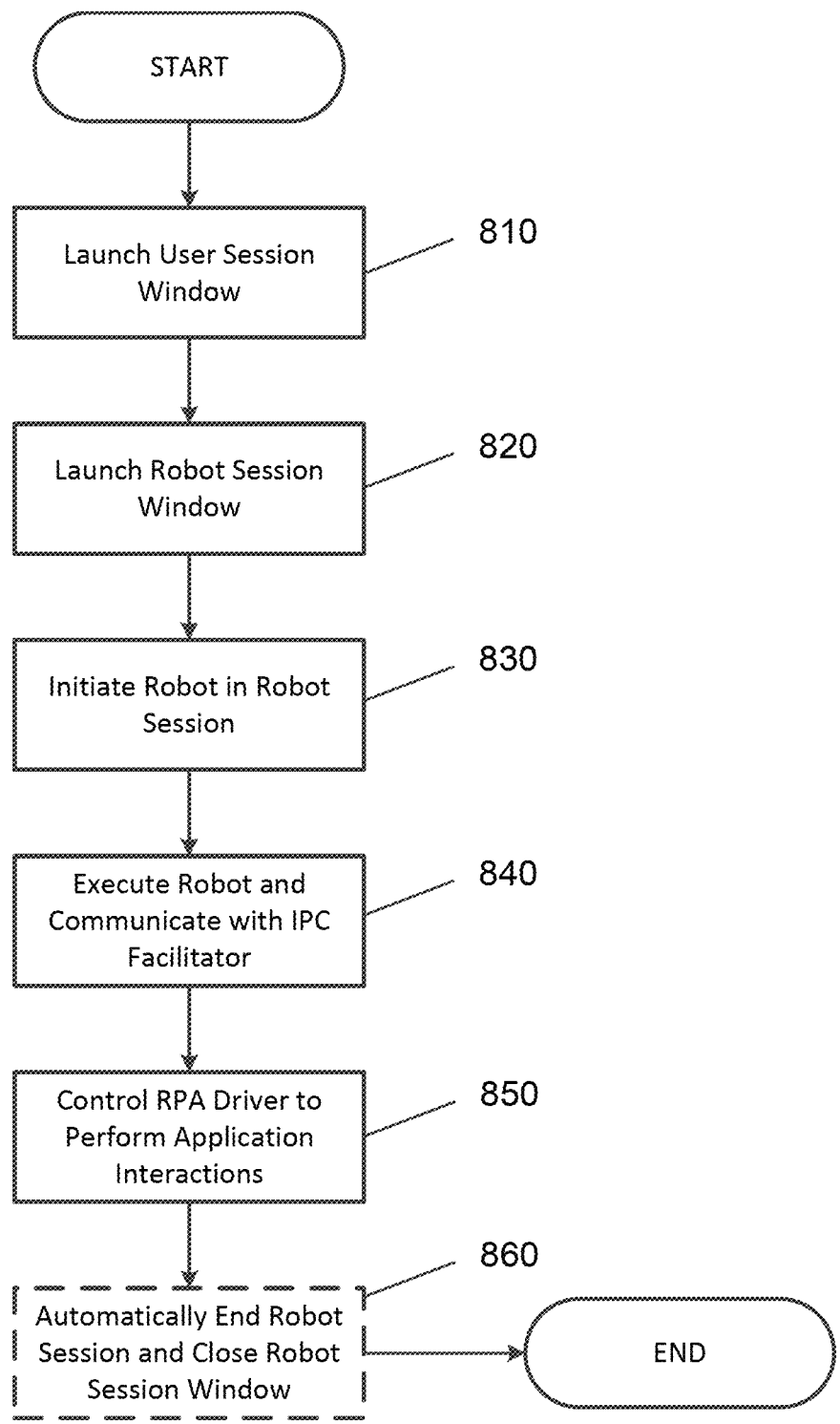

AUTOMATION OF A PROCESS RUNNING IN A FIRST SESSION VIA A ROBOTIC PROCESS AUTOMATION ROBOT RUNNING IN A SECOND SESSION

CROSS-REFERENCE TO RELATED APPLICATIONS

This application is a continuation of U.S. Nonprovisional patent application Ser. No. 16/925,544 filed Jul. 10, 2020, which is a continuation of U.S. Nonprovisional patent application Ser. No. 16/924,910 filed Jul. 9, 2020, now U.S. Pat. No. 11,157,339. The subject matter of these earlier filed applications is hereby incorporated by reference in its entirety.

FIELD

The present invention generally relates to robotic process automation (RPA), and more specifically, to automation of a process running in a first session via RPA robot(s) running in a second session.

BACKGROUND

Attended automation RPA robots, for example, typically run on a computing system operated by a user in the same session as that user. The RPA robots may work with a user to accomplish certain tasks at a user's command, for example. However, in attended automation scenarios, the RPA robot may "take over" the user's computing system. The user may wish to perform other activities while the robot is interacting with the computing system, but the user is prevented from doing so. In other words, the robot controls applications through the user interface (UI) in the same manner that the user would (e.g., simulating mouse clicks and keyboard input).

Various technologies exist that create complete or partial copies of an operating system or the applications running thereon. Emulators have been around for decades and may provide developers with the ability to test and debug applications. For instance, emulators may provide developers with the ability to test and debug mobile applications that use an operating system that does not support running development tools directly. Both Android® and iOS® offer emulators that can be run from a development machine to test and debug an Android® or iOS® application since the developer tools cannot be natively run on those mobile operating systems.

Simulators allow a developer to host a window on his or her local machine that lets the developer test and debug behavior of an application that are difficult or impossible to perform on a development machine. For example, simulators allow the developer to click a button to rotate the simulator, which tells the application running inside the simulator the device has been rotated for the purposes of testing and debugging application behavior that responds to these events. Another common example is multi-touch. Many developer machines do not support touch, so the simulator lets the developer test and debug how the application responds to multiple touch points. Android® and iOS® emulators also offer simulation capabilities. Furthermore, Microsoft® offers a simulator for their Universal Windows Platform (UWP) applications.

Virtual machines host a second operating system on the machine and can be opened and monitored through a window. This runs a completely different operating system and shares the hardware with the host machine. The "guest" machine must have its own copies of applications installed and does not share common resources or files with the user machine.

Docker® containers are conceptually a hybrid form of virtual machine. All of the applications that need to be executed are packaged into an immutable package that is executed directly on the host operating system. The package is not a complete copy of another operating system, but it does not by default share or have access to any of the applications or resources on the host machine. Thus, from a user experience perspective, Docker® containers feel similar to a virtual machine, but technically, the containers are not executing on a completely separate operating system.

However, conventional emulators, simulators, virtual machines (VMs), and hybrid VMs providing operating system (OS)-level virtualization (e.g., Docker® containers) do not address the issues that arise with attended automation robots operating on the same computing system as the user. Thus, the user essentially becomes a spectator for his or her own computing system, watching the robot work and being unable to interact with other applications on the machine that require user interaction. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to automation of a process running in a first session via RPA robot(s) running in a second session.

In an embodiment, a computer program is embodied on a non-transitory computer-readable medium. The computer program is configured to cause at least one processor to execute an inter-process communication (IPC) facilitator and an RPA driver in a first session and execute an RPA robot in a second session. The computer program is also configured to cause the at least one processor to receive one or more messages from the RPA robot via IPC, by the IPC facilitator, and control the RPA driver to interact with an application or application object running in the first session, by the IPC facilitator, based on the received one or more messages from the RPA robot.

In another embodiment, a computer-implemented method includes sending one or more messages to an IPC facilitator running in a first session via IPC, by an RPA robot running in a second session, and receiving one or more messages from the RPA robot via IPC, by the IPC facilitator. The computer-implemented method also includes controlling an RPA driver running in the first session to interact with an application or application object also running in the first session, by the IPC facilitator, based on the received one or more messages from the RPA robot.

In yet another embodiment, a computer-implemented method includes receiving one or more messages from an RPA robot running in a second session via IPC, by an IPC facilitator running in a first session. The computer-implemented method also includes controlling an RPA driver running in the first session to interact with an application or application object also running in the first session, by the IPC facilitator, based on the received one or more messages from the RPA robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 6A-G illustrate an example of completing a form in a user session using an RPA robot running in a robot session, an IPC facilitator, and an RPA driver, according to an embodiment of the present invention.

FIGS. 7A-G illustrate an example of completing a form in a user session using an RPA robot running in a robot session via direct variable modification, according to an embodiment of the present invention.

FIG. 8 is a flowchart illustrating a process for automation of a process running in a user session via an RPA robot running in a robot session, an IPC facilitator, and an RPA driver, according to an embodiment of the present invention.

Unless otherwise indicated, similar reference characters denote corresponding features consistently throughout the attached drawings.

DETAILED DESCRIPTION OF THE EMBODIMENTS

Figure 1:
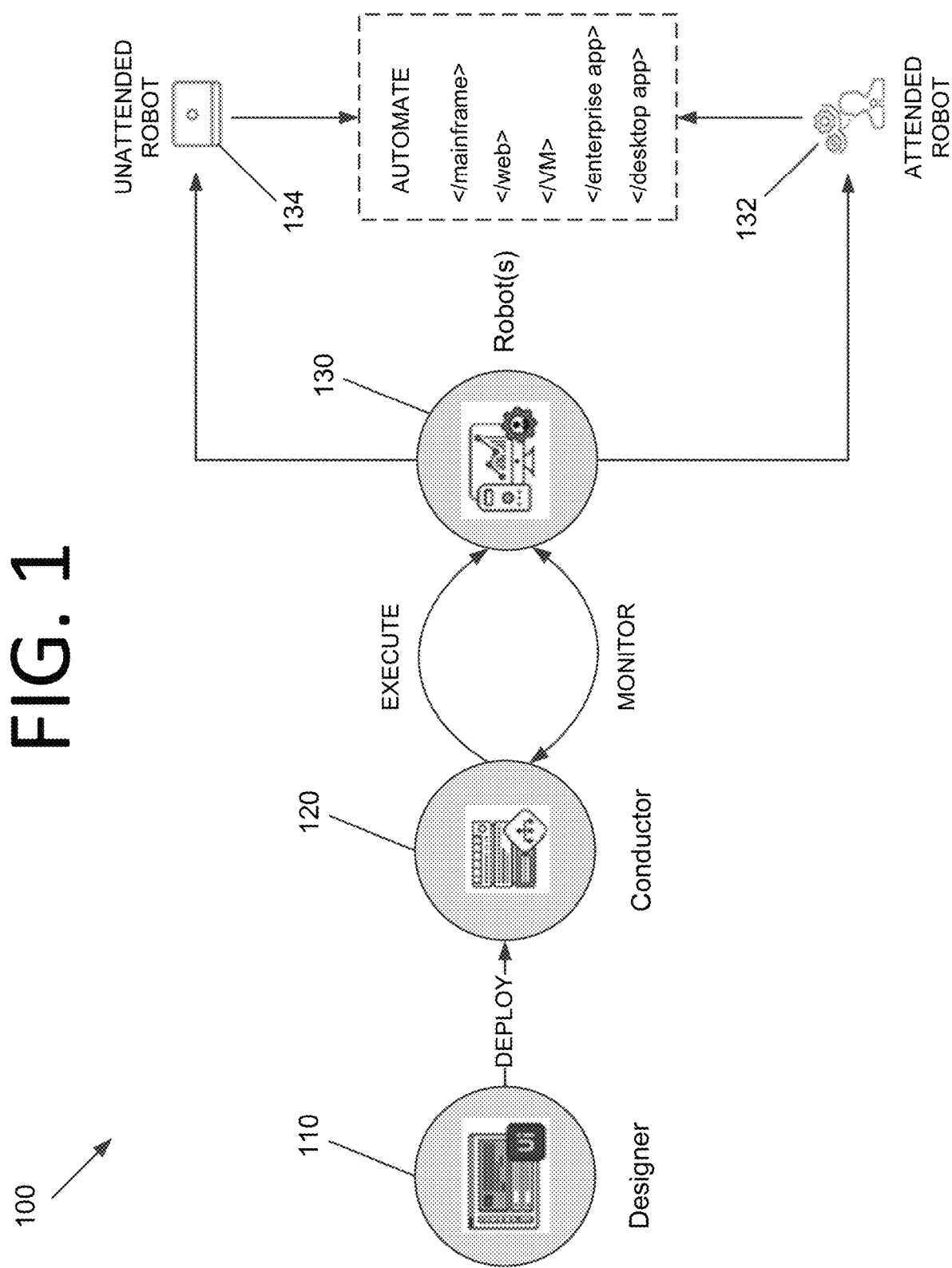
FIG. 1 is an architectural diagram illustrating a robotic process automation (RPA) system, according to an embodiment of the present invention.

Some embodiments pertain to automation of a process running in a first session via RPA robot(s) running in a second session. For instance, a form (e.g., a web page, an email application (e.g., Outlook®), a spreadsheet application (e.g., Excel®), a customer relationship management (CRM) system application (e.g., Salesforce®), an enterprise resource management (ERM) system, a supply chain management system, a custom-built computer application, a mobile application, another application having fillable fields, etc.) may be displayed in a first session. In some embodiments, the first session may be a user session (also called a main session or a parent session herein). One or more RPA robots that retrieve and/or interact with data for an application in the first session may run in one or more other sessions (also called robot sessions, second sessions, or secondary sessions herein). In certain embodiments, the robot session may be a child session of the first session.

In some embodiments, the RPA robot running in the client session sends messages to an RPA driver running in the main session via inter-process communication (IPC). Based on the IPC communication(s) from the RPA robot, the RPA driver may implement various operating system (OS) and/or application programming interface (API)-level interactions with a computing system. For instance, the driver may move the mouse, click a button, interact with a menu, enter text in a field, open or close a window, move and/or resize a window, or perform any other suitable interaction without deviating from the scope of the invention.

In order to implement this functionality, the driver may include or be controlled or called by an IPC facilitator. The IPC facilitator may be a separate application or process, or may be a subprocess of the driver in some embodiments. The IPC facilitator may listen for IPC messages from the RPA robot in the client session (e.g., listen for a trigger), send communications to and receive communications from the RPA robot, monitor RPA robot execution status, a combination thereof, etc. The IPC facilitator may also cause the driver to implement the desired functionality in the parent session based on the IPC communication(s) from the RPA robot. In certain embodiments, the IPC facilitator may be configured with a script for a given RPA robot. In some embodiments, the IPC facilitator may be custom designed for the functionality to be performed in the parent session.

In some embodiments, the RPA robot in the client session may directly modify variables stored in memory on a computing system. An application running in the parent session that accesses these variables could then update displayed values when the display refreshes or the application otherwise reloads its UI. For example, variables of an Excel® spreadsheet could be modified directly by the RPA robot running in the client session, which would change the values displayed in the parent session as well.

In some embodiments, the operation of the RPA robot(s) may not prevent the user from using other applications or instances when the RPA robot is running, but the data modifications made by the RPA robot(s) may be visible to the user as the application display refreshes in the user session window. However, in certain embodiments, the RPA robot(s) may interact with applications that do not have a user interface.

In some embodiments, the process may operate as follows. A user may click a button or otherwise cause an RPA robot to launch in a child session of the user session (e.g., the parent or main session that is launched when the user boots up his or her computing system). In certain embodiments, the robot session may already be running, or may be separately launched by the user from a robot tray, for example. The user may cause the robot to execute its workflow in the child session, and the robot may then interact with one or more applications in the main session by communicating with an IPC facilitator running in the parent session. The IPC facilitator may then cause an RPA driver to carry out the desired functionality in the parent session.

In some embodiments, the RPA robot running in the robot session may pause operation and provide a message if at least one application which the workflow pertains to has not been launched, and the IPC facilitator may launch the application so the robot can continue operation. Once the robot begins executing its workflow, changes to displayed data in the application may be visible in the main session window when such changes are made via the IPC facilitator and RPA driver. For instance, data may appear as the driver fills the data in based on data provided by the RPA robot in the client session (e.g., via IPC, saving data in a flat file or database, etc.).

By way of nonlimiting example, in some embodiments, a shortcut may be created in Salesforce® that causes an RPA robot to launch in a client session, or interacts with an already running RPA robot in the client session. When a user clicks the shortcut, the RPA robot begins executing an RPA process as designed in its RPA workflow. Based on the results of its execution (e.g., retrieving information from a database, calling an artificial intelligence (AI)/machine learning (ML) model and obtaining results, obtaining information from multiple legacy systems, etc.), the RPA robot then interacts with an IPC facilitator, which then interacts accordingly with a running Salesforce® application instance in the parent session. This may cause some of the displayed information in the running Salesforce® application instance to change and be visible to the user, for example, as the RPA driver performs the interactions.

In certain embodiments, the RPA robot running in the client session may cause an application in the parent session to open via the IPC facilitator. The IPC facilitator, via the RPA driver, may then access the data associated with the application and make additions, changes, and/or deletions. In this manner, even though the RPA robot is not running in the parent session, the RPA robot is still able to cause interactions in the parent session applications in a manner that appears similar to a RPA robot running in the parent session itself, but is functionally different.

In some embodiments, a user may cause a robot to execute a workflow in the client session that goes to a website and collects some information. The RPA robot may then provide this information to an IPC facilitator, which then causes an RPA driver to enter the collected information in a spreadsheet that is visible in the main session, for example. In certain embodiments, an application, such as Salesforce®, is open in the main session. The user then runs an automation in the client session that reads the current client ID, goes to a website (e.g., HubSpot®), and collects information pertaining to client interactions with the website, for example. However, attended RPA robots may interact with any suitable application(s) via the RPA facilitator and/or may obtain data from any suitable source (e.g., a database, another application, etc.) without deviating from the scope of the invention.

Applications of some embodiments include, but are not limited to, emulators, simulators, VMs, and hybrid VMs providing OS-level virtualization (e.g., Docker® containers). Some embodiments create and host one or more robot sessions as a window including the UIs of applications being controlled by an attended automation process. In certain embodiments, only the interfaces of applications with which the robot(s) interact are shown. In some embodiments, no client session window is shown at all. As used herein, a "window" may apply to a window representing a UI shown within the main UI, a second screen of a second display of a computing system, a virtual desktop, an isolated environment (i.e., a window (referred to as the "host") that draws the UIs of all applications launched inside the environment (referred to as "children") and runs them in the context of the host session), etc. without deviating from the scope of the invention. Running multiple sessions allows robot(s) to operate in their session(s) while the user interacts with a first session (e.g., a parent session). The user may thus be able to interact with various applications while the robot interacts with the data thereof.

In some embodiments, any desired number of sessions for any number of robots may be created and used without deviating from the scope of the invention. For instance, a user may operate in a first session, a first robot may operate in a second session, a second robot may operate in a third session, etc. In certain embodiments, multiple robots may operate in a single session, potentially taking turns for interacting with one or more common applications via the RPA facilitator.

The functionality for creating the session may be implemented via Windows® Terminal Services Child Sessions, for example, which can create a session back into a user's own machine without the user having to log out. The newly created session appears as a child window and contains and launches applications that exist in the user's session. In other words, the separation between the user and the robot occurs at the UI level. If a file is deleted, for example, this occurs across all sessions running on the computing system.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
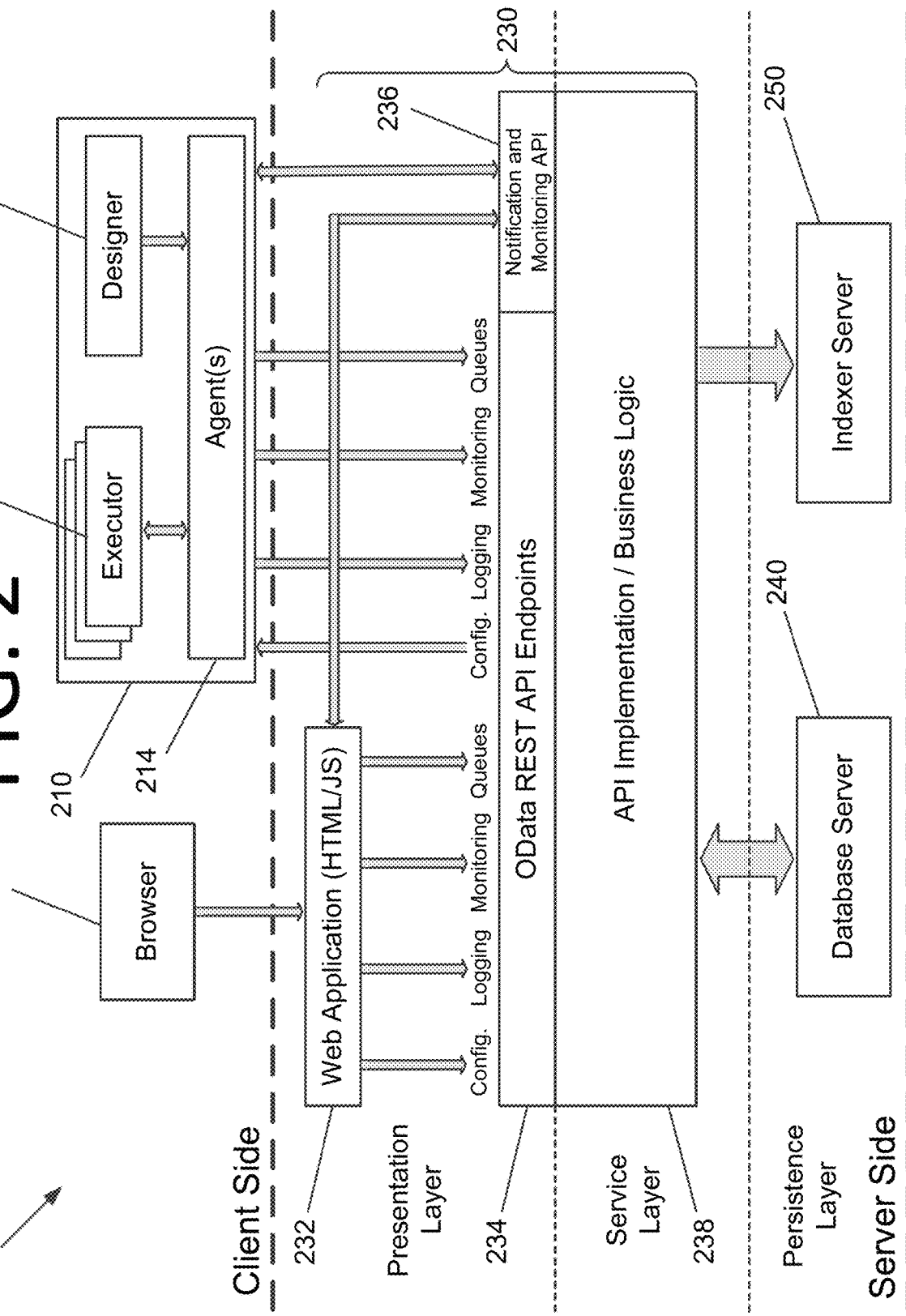
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210.

Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
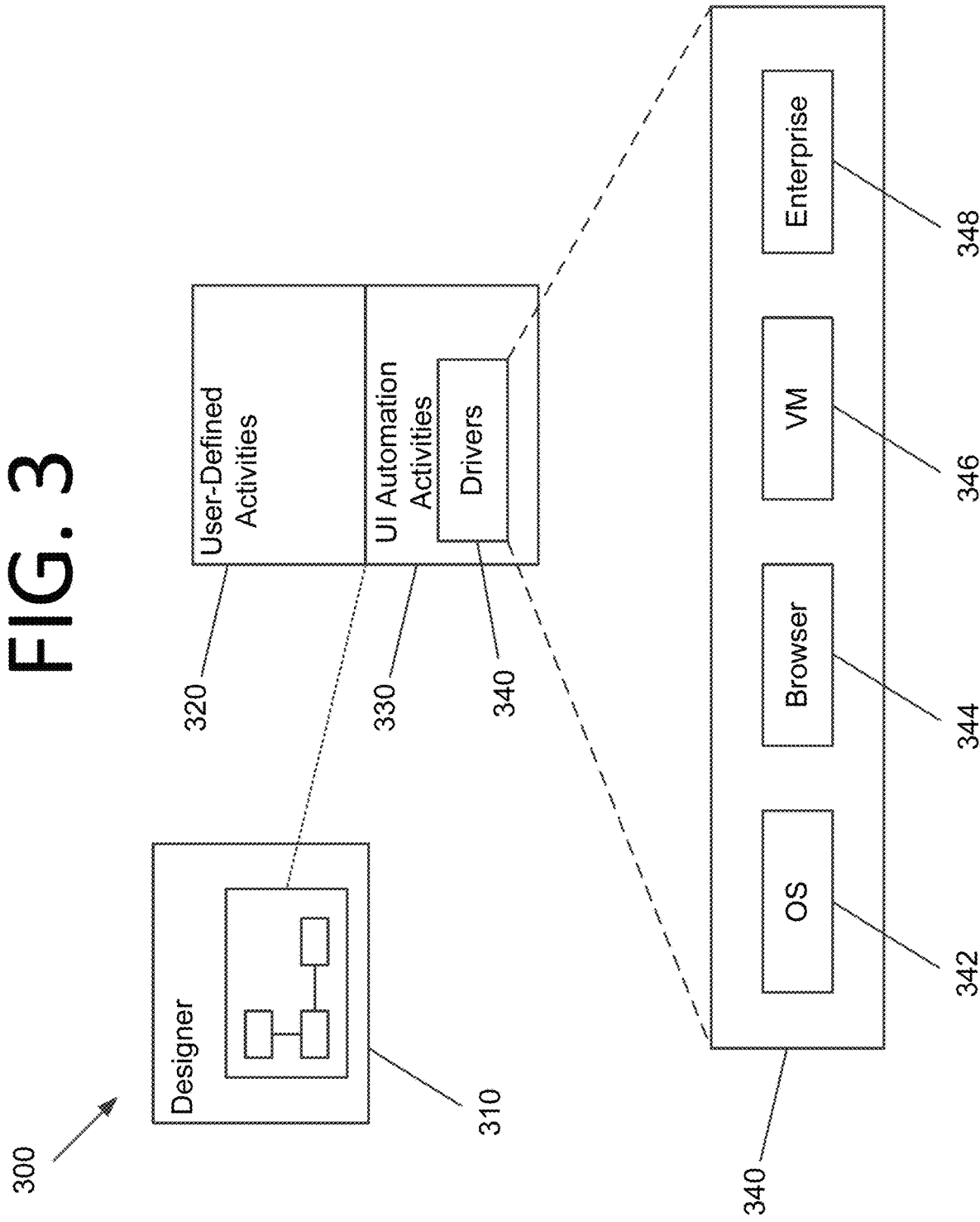
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
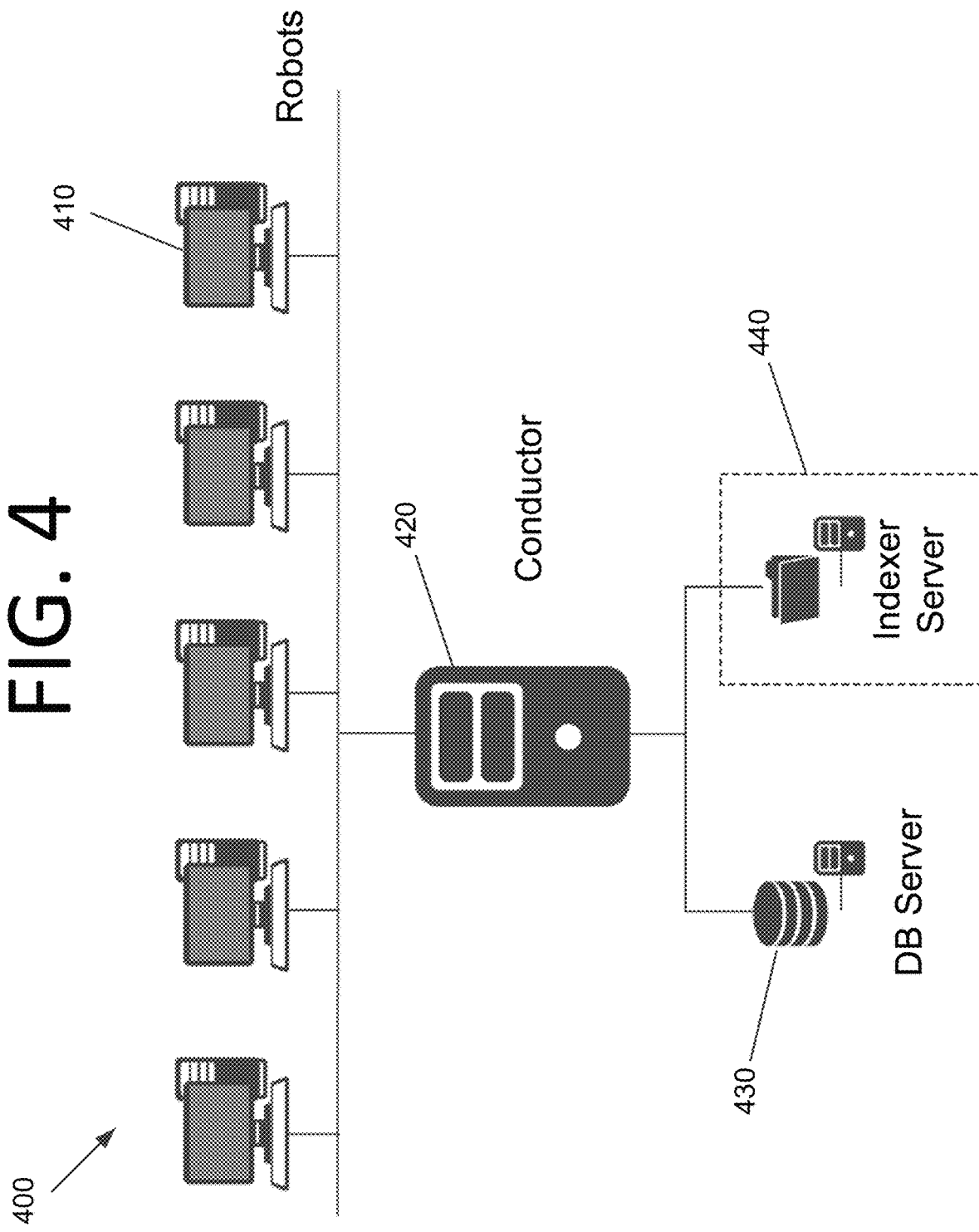
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
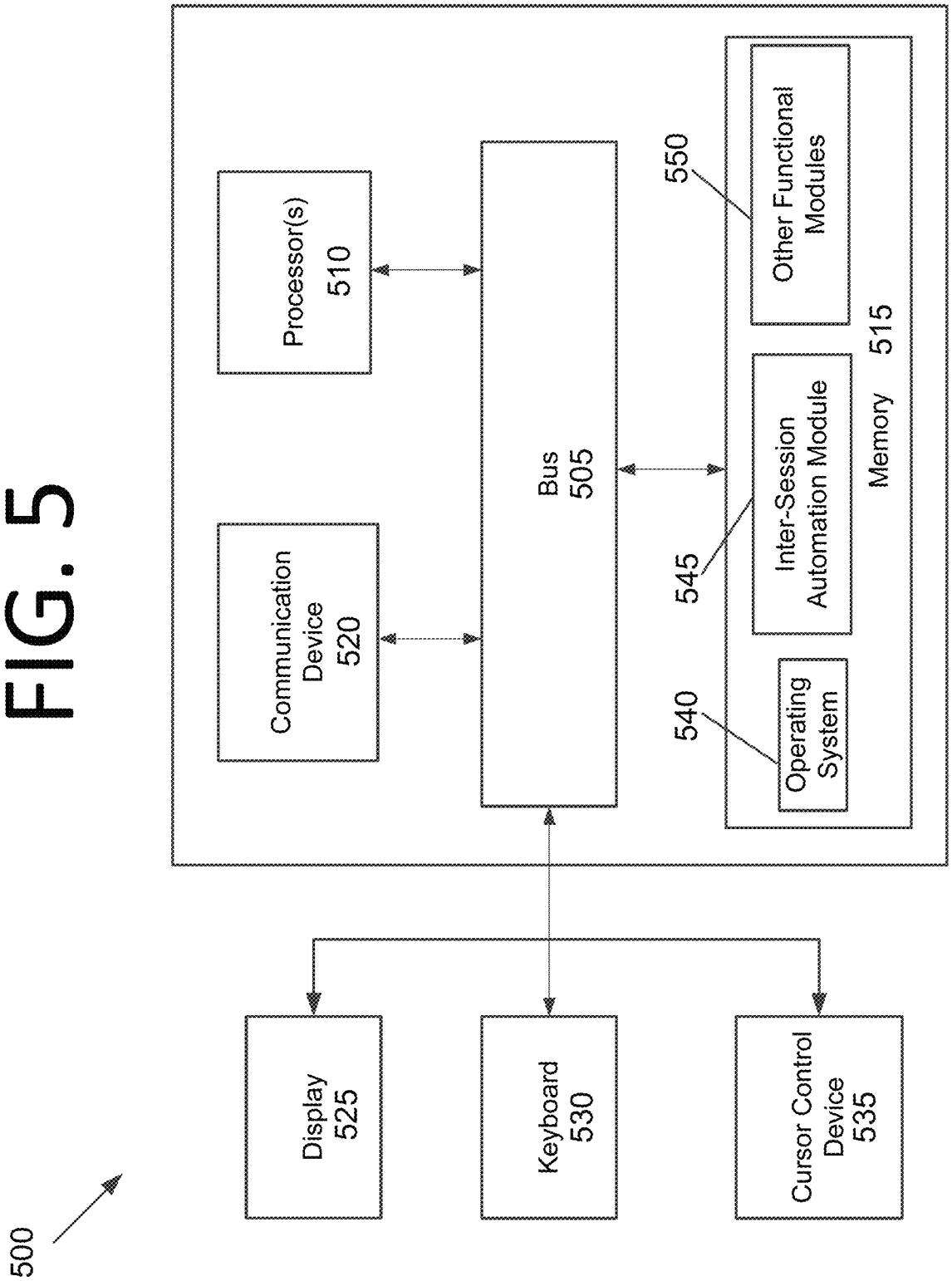
FIG. 5 is an architectural diagram illustrating a computing system configured to facilitate inter-session automation for RPA robots, according to an embodiment of the present invention.

FIG. 5 is an architectural diagram illustrating a computing system 500 configured to facilitate inter-session automation for RPA robots, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an inter-session automation module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Conventionally, in attended automation, human users wait while an RPA robot running in the same session completes its tasks. However, some embodiments create one or more robot sessions to host and run RPA robots therein. Unlike existing RPA systems, users can benefit from the ability to interact with their computing system while the robot(s) are running automations in the robot session(s). The user may still monitor what the robot is doing and interact with the robot through host automation window(s) for the robot session(s) in some embodiments. In some embodiments, the user and robot session(s) may be running on a remote machine that is controlled by the user's computing system.

However, in some embodiments, the RPA robot does not interact with applications that the user is using via the IPC facilitator. The RPA robot may instead interact with an application or other process that is not visible to the user or is otherwise not being used by the user via the RPA facilitator and RPA driver. Such robots typically do not augment user interactions with applications directly and may be considered to be unattended robots.

In certain embodiments, the RPA robot may be running on a user's computing system and driving a remote computing system through the remote runtime (e.g., via UiPath Remote Runtime™). UiPath Remote Runtime™ is a component that facilitates the communication between a remote application or desktop, such as Citrix Virtual Apps and Desktops™, and the dedicated UiPath® extension (e.g., the UiPath® extension for Citrix® or the UiPath® extension for Windows® Remote Desktop). UiPath Remote Runtime™ gathers information pertaining to targeted UI elements of remote applications and sends this information to the corresponding extension so that selectors are natively generated in UI Explorer™.

Figure 6B:
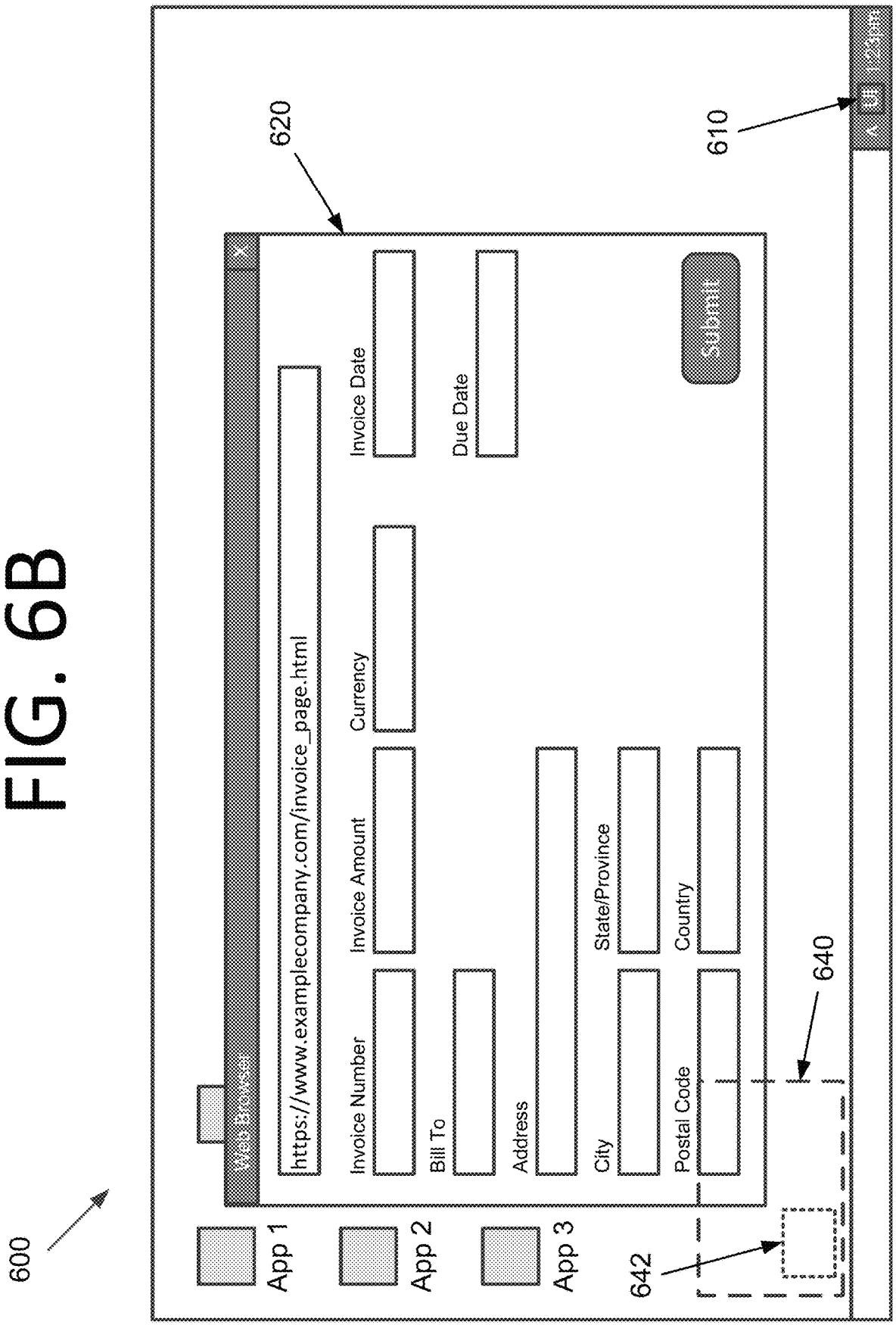

FIGS. 6A-G illustrate an example of completing a form in a user session using an RPA robot running in a robot session, an IPC facilitator, and an RPA driver, according to an embodiment of the present invention. In FIG. 6A, a user session window 600 is shown, where a user is able to interact with applications in the UI and no robot is currently executing. A robot tray icon 610 is visible in the lower right portion of user session window 600. An RPA driver 640 includes an IPC facilitator 642 as a subprocess in this embodiment. However, in certain embodiments, IPC facilitator 642 may be a separate application or process that communicates with RPA driver 640 without deviating from the scope of the invention. In such embodiments, IPC facilitator 642 may communicate with RPA driver 640 via IPC, via API calls, etc. Indeed, in certain embodiments, IPC may not be used.

Figure 6C:
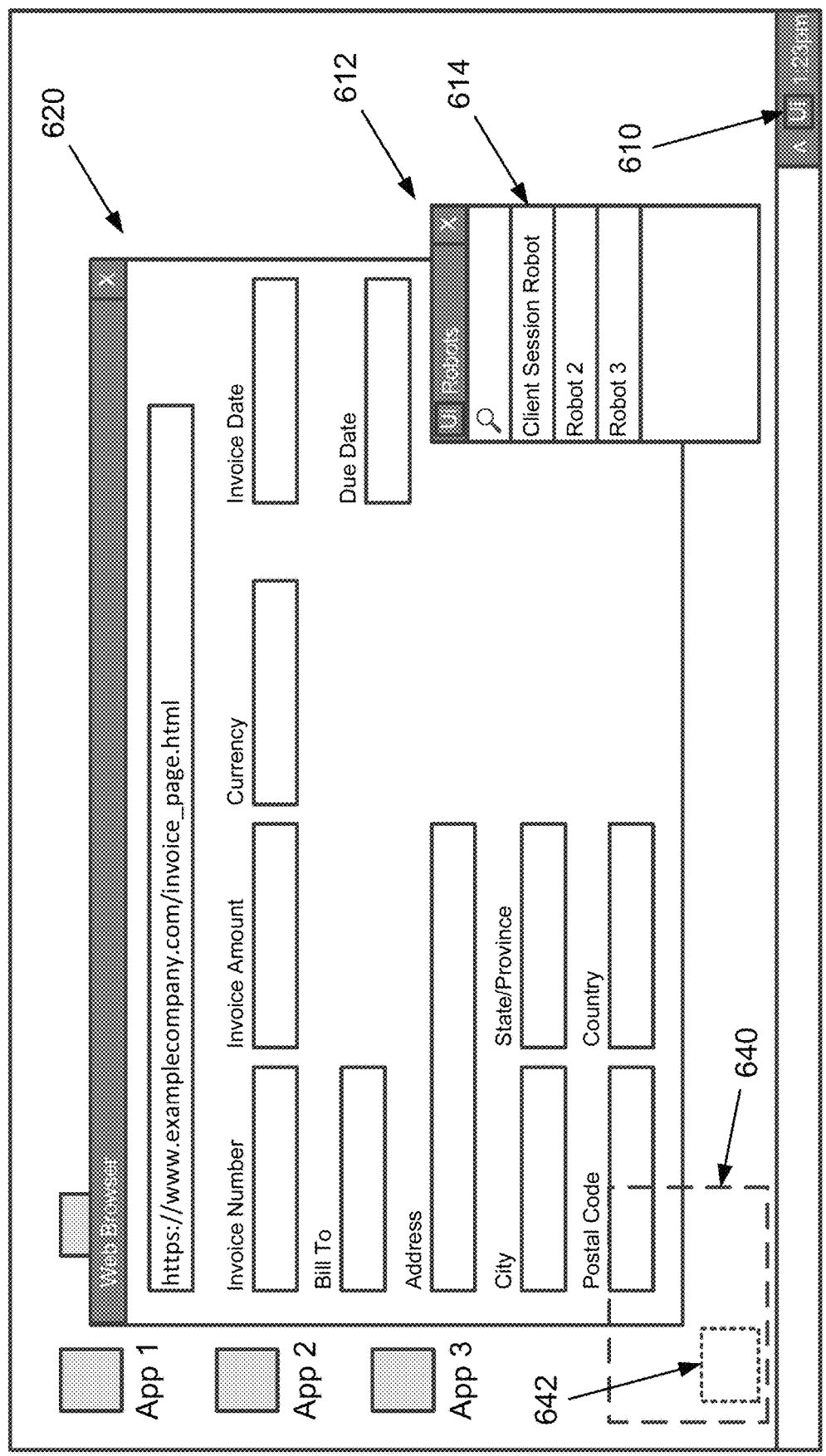
Figure 6D:
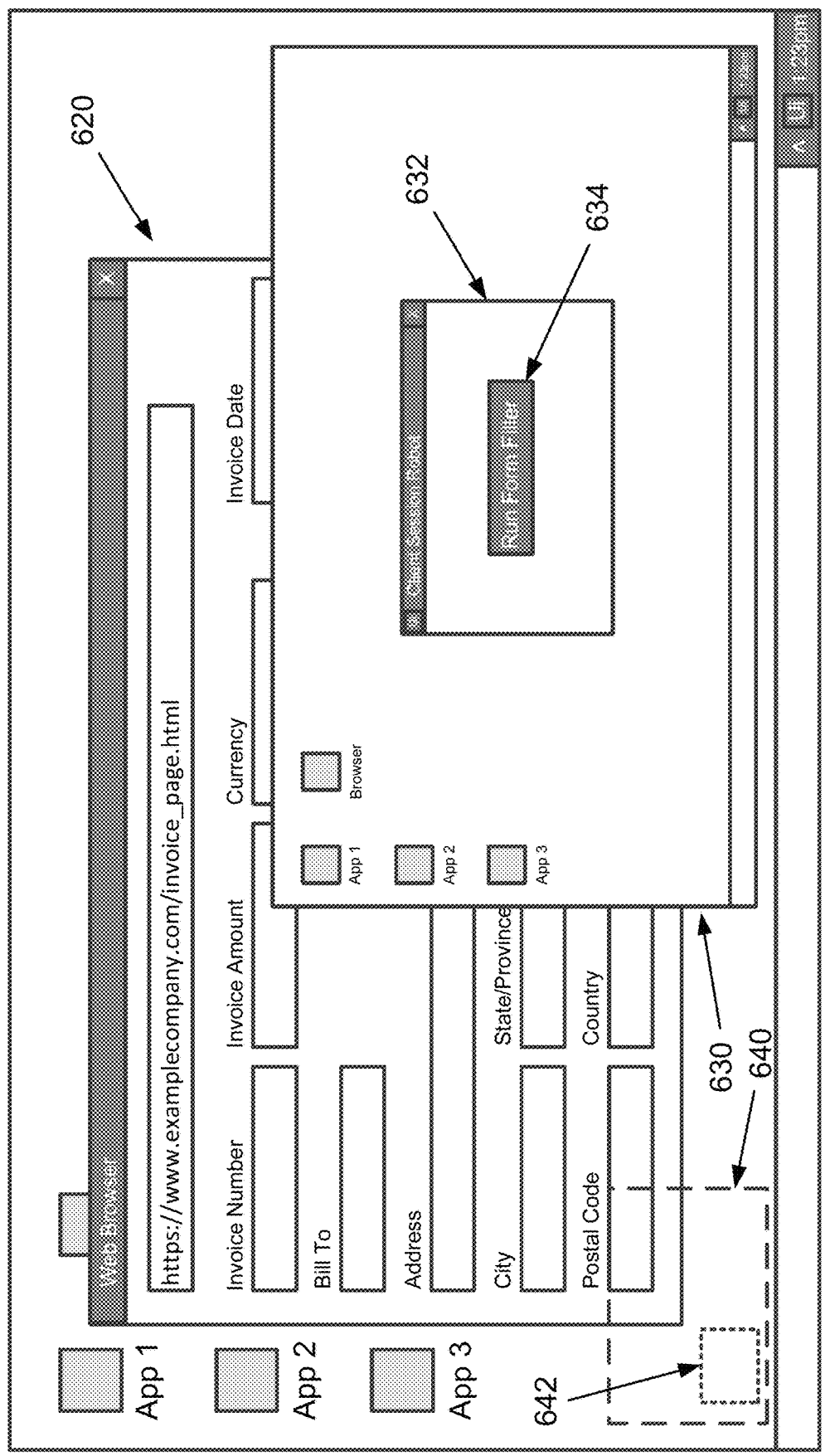

In FIG. 6B, the user launches a web browser and visits an invoice creation web page 620. In FIG. 6C, the user pulls up a robot tray 612 (e.g., by clicking robot tray icon 610) and selects a client session robot option 614 to execute on his or her computing system. After selecting the robot to be executed, as shown in FIG. 6D, a robot session window 630 for a robot session appears as a child window on the screen. The RPA robot will operate in the robot session. In this embodiment, a window 632 for the client session robot automatically launches within robot session window 630 and includes a button 634 for run a form filler workflow to retrieve data for web page 620 in the user session.

In some embodiments, the robot session window may not be displayed, and the robot may launch, operate, and close automatically without being visible to the user. In certain embodiments, the robot may close its session after completing its workflow. In some embodiments, rather than launching from a robot tray, the robot session may be initiated and the robot may launch and operate without the use of robot tray 612 (e.g., due to the user clicking a button in an application of the main session).

Figure 6E:
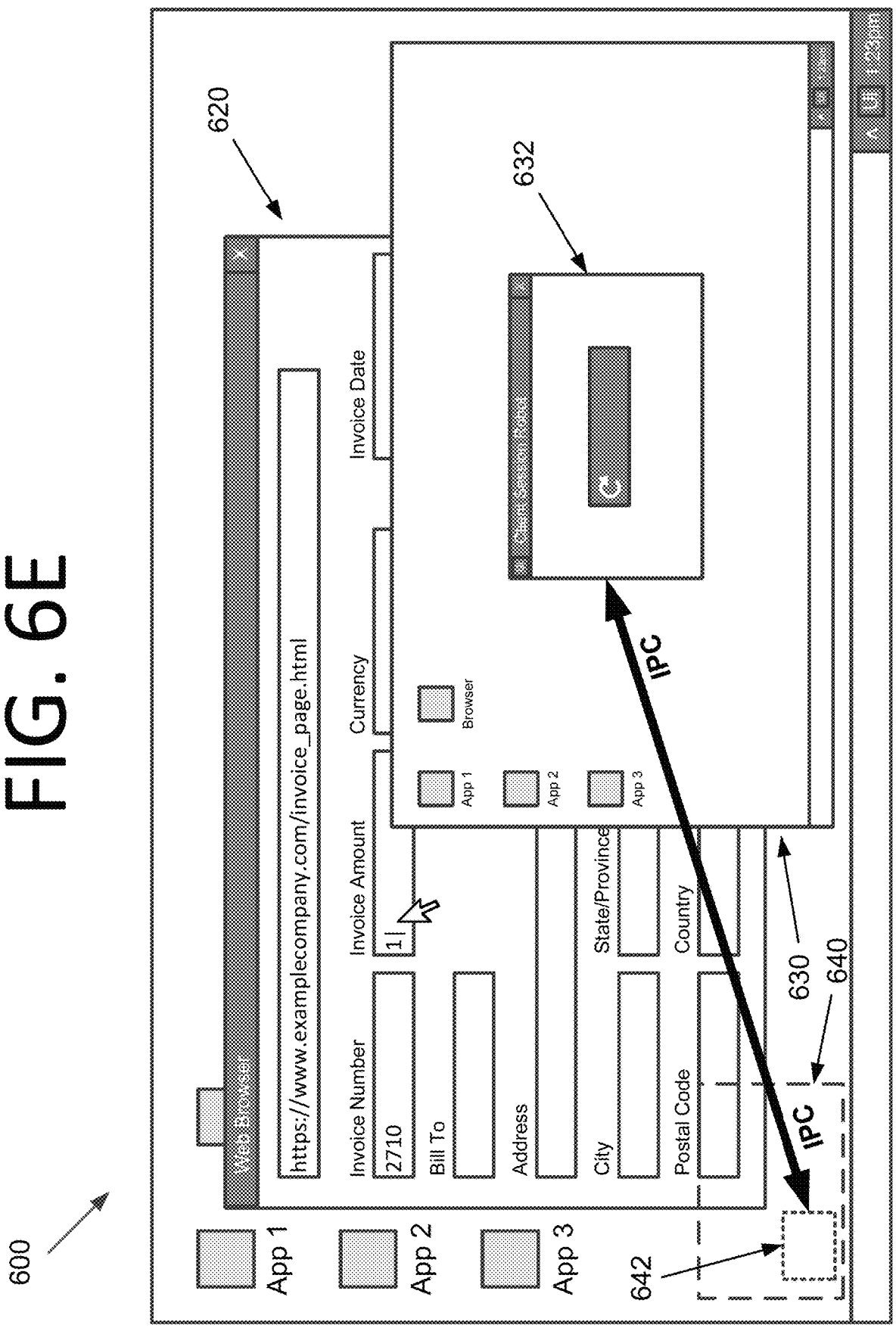

Turning to FIG. 6E, after the user clicks button 634, the robot begins retrieving data for filling out form fields in web page 620. As the robot retrieves portions of the data, the data is sent to IPC facilitator 642, which then causes RPA driver 640 to enter the data into web browser 620. For instance, RPA driver 640 may move the mouse over a given field and cause the entry of text from the data into the field. In FIG. 6E, RPA driver 640 has already completed the Invoice Number field and has now moved the mouse to the Invoice Amount field, clicked on it, and entered the number 1. The caret appears after the number 1 in FIG. 6E. In certain embodiments, RPA facilitator 642 may receive the complete set of data from robot 632 before causing RPA driver 640 to fill out the fields of web page 620.

Per the above, communication between the robot running in the robot session and IPC facilitator 642 running in the user session is accomplished using an IPC protocol. IPC protocols may facilitation communication via the network, pipes, Component Object Model (COM), Remote Procedure Calls (RPC), sockets, etc. Suitable session creation mechanisms and IPC protocols may be used for other operating systems as well, where supported. The robot may send status notifications back to IPC facilitator 642 (e.g., indicating that the robot is starting, running, paused, etc.), retrieved data, error messages, commands, or other communications via the IPC protocol as well.

The associated text from the data retrieved by the robot is visible to the user as it is entered by RPA driver 640 when web page 620 is not covered by another window or minimized. While RPA driver 640 completes the data interactions for the form, the user can interact with other applications and continue to be productive, or even interact with web page 620 itself in some embodiments, although the user's entries may be overwritten if RPA driver 640 modifies data for the same field that the user entered information in.

Figure 6F:
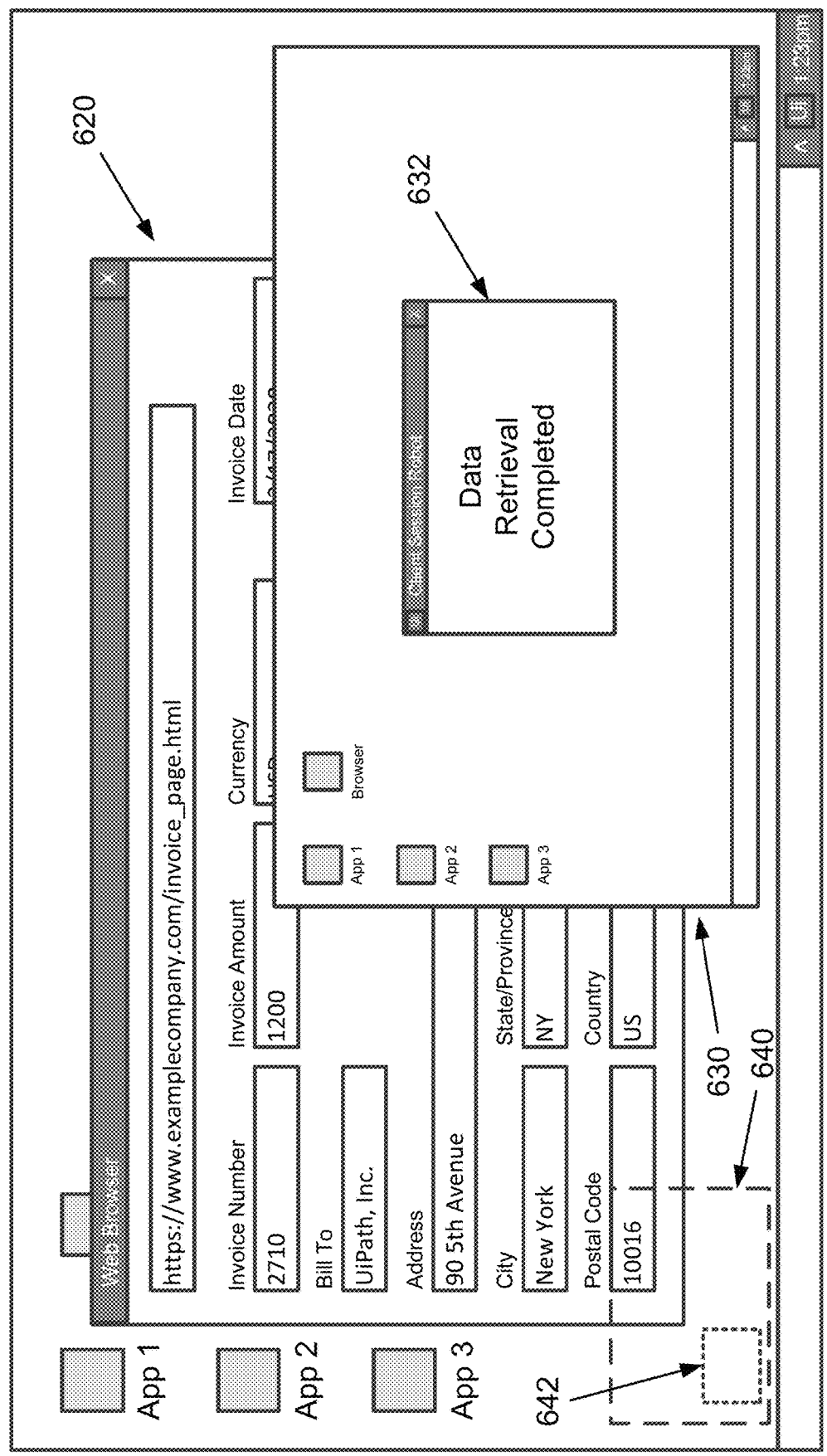
Figure 6G:
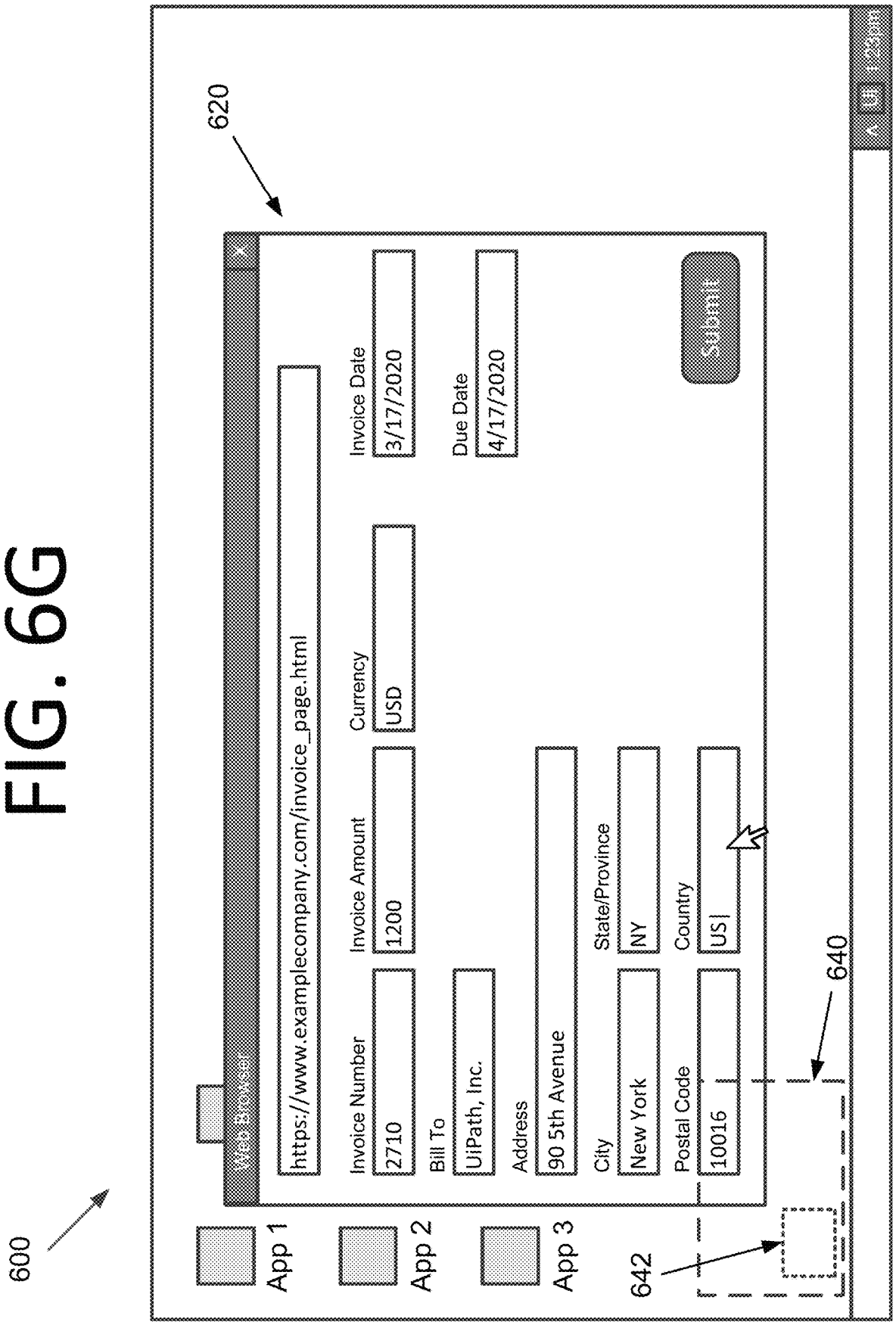

Turning to FIG. 6F, after the robot completes its workflow, a message is displayed in window 632. As can be seen in the background, the robot has completed the data retrieval for the form fields, and the new entries for the form fields are visible in web page 620 after entry by RPA driver 640. The user may then close out robot session window 630, the robot may close robot session window 630 (and potentially the robot session itself) automatically, or robot session window 630 may stay open. The user may then submit the completed form. See FIG. 6G.

Figure 7B:
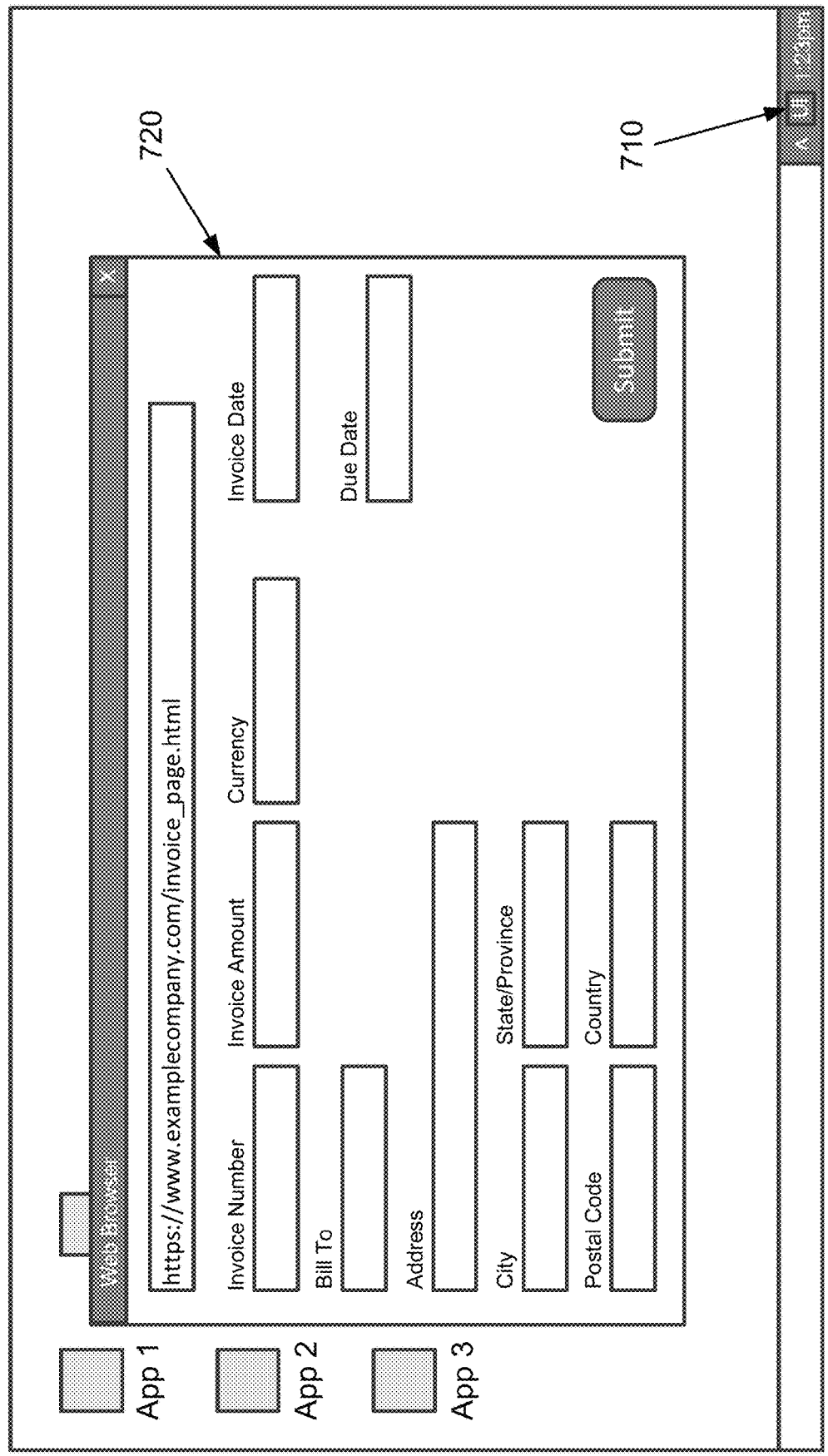

FIGS. 7A-G illustrate an example of completing a form in a user session using an RPA robot running in a robot session via direct variable modification, according to an embodiment of the present invention. In FIG. 7A, a user session window 700 is shown, where a user is able to interact with applications in the UI and no robot is currently executing. A robot tray icon 710 is visible in the lower right portion of user session window 700.

Figure 7C:
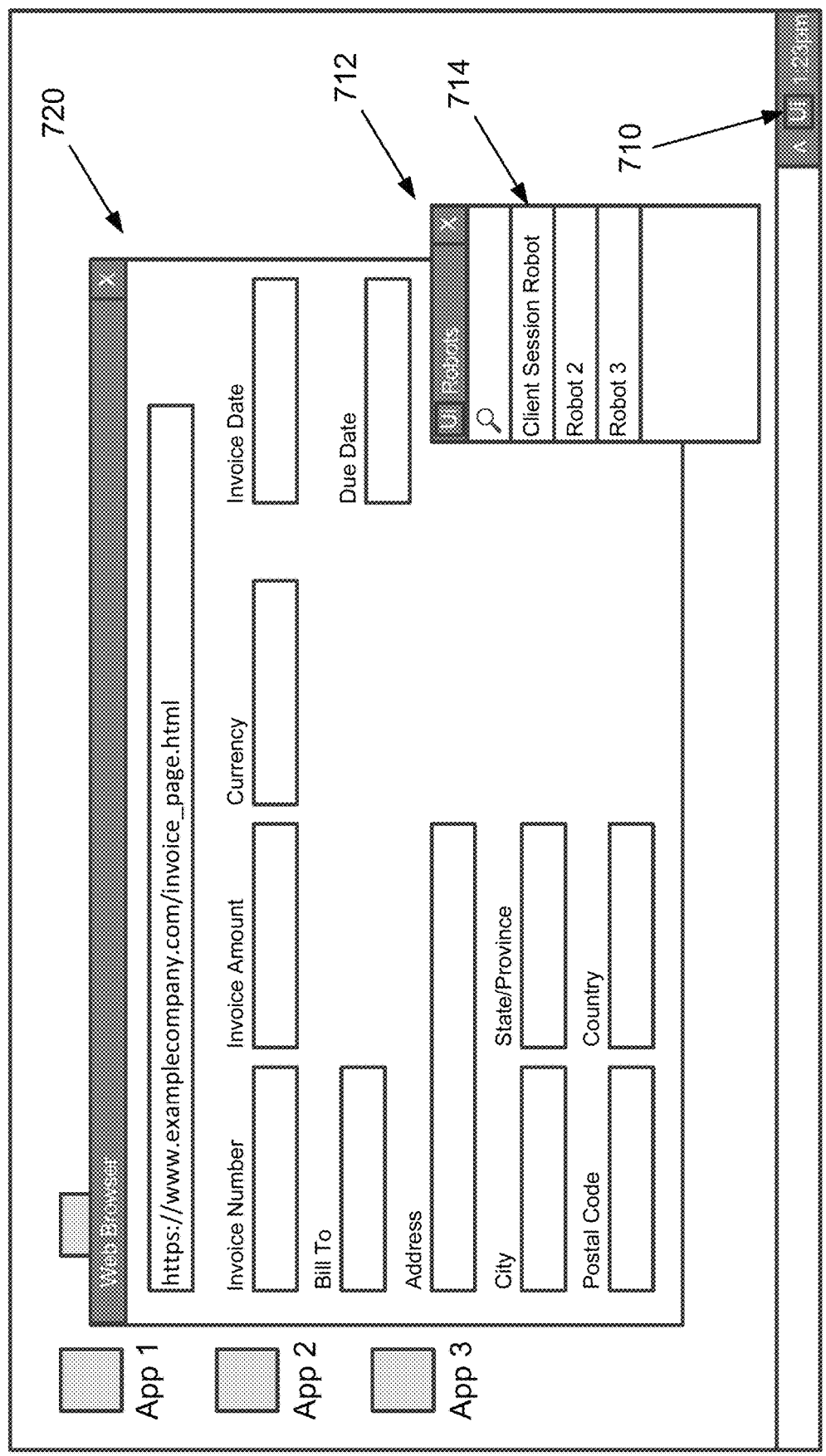
Figure 7D:
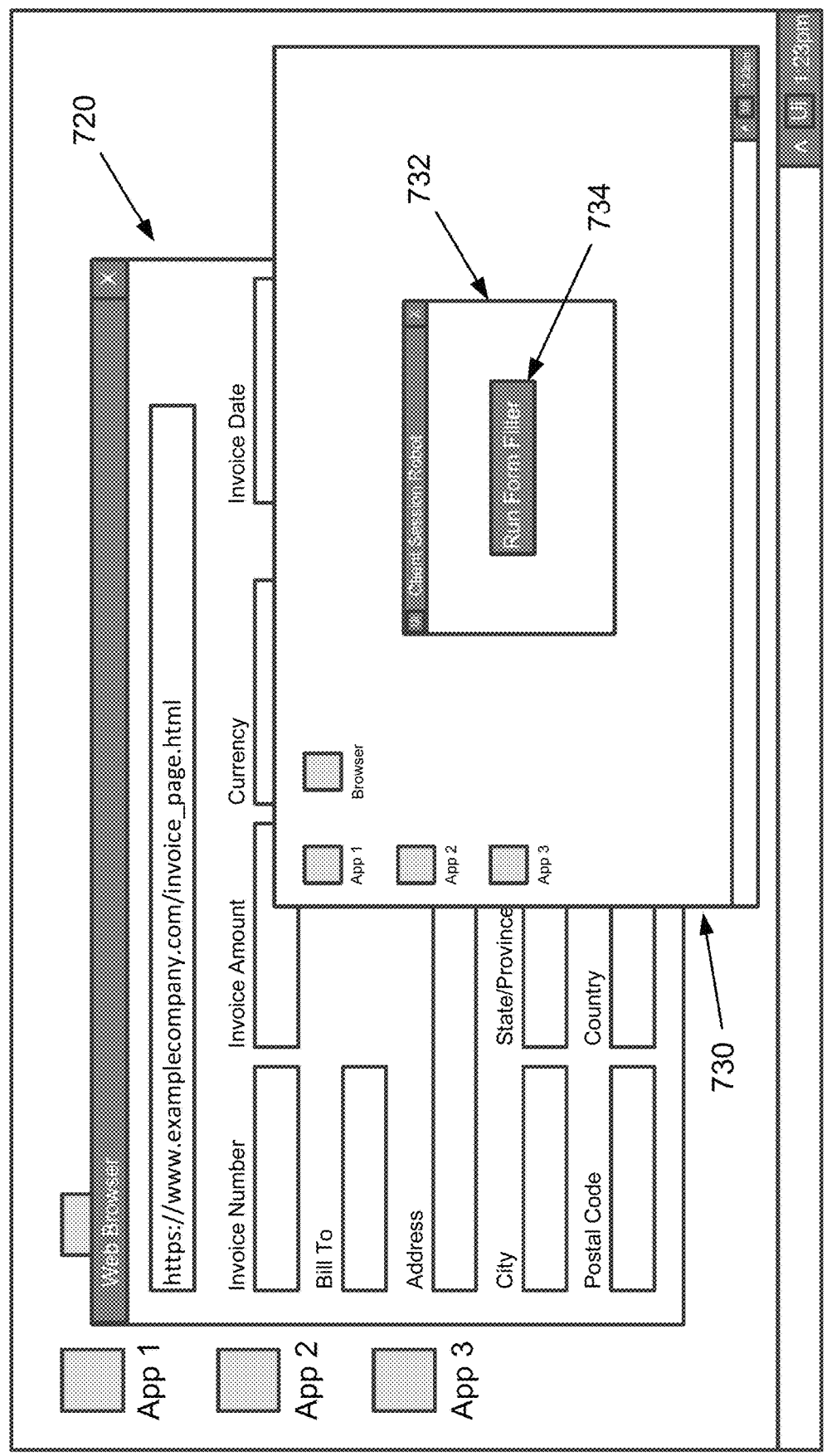

In FIG. 7B, the user launches a web browser and visits an invoice creation web page 720. In FIG. 7C, the user pulls up a robot tray 712 (e.g., by clicking robot tray icon 710) and selects a client session robot option 714 to execute on his or her computing system. After selecting the robot to be executed, as shown in FIG. 7D, a robot session window 730 for a robot session appears as a child window on the screen. The RPA robot will operate in the robot session. In this embodiment, a window 732 for the client session robot automatically launches within robot session window 730 and includes a button 734 for run a form filler workflow for web page 720 in the user session.

In some embodiments, the robot session window may not be displayed, and the robot may launch, operate, and close automatically without being visible to the user. In certain embodiments, the robot may close its session after completing its workflow. In some embodiments, rather than launching from a robot tray, the robot session may be initiated and the robot may launch and operate without the use of robot tray 712 (e.g., due to the user clicking a button in an application of the main session).

Figure 7E:
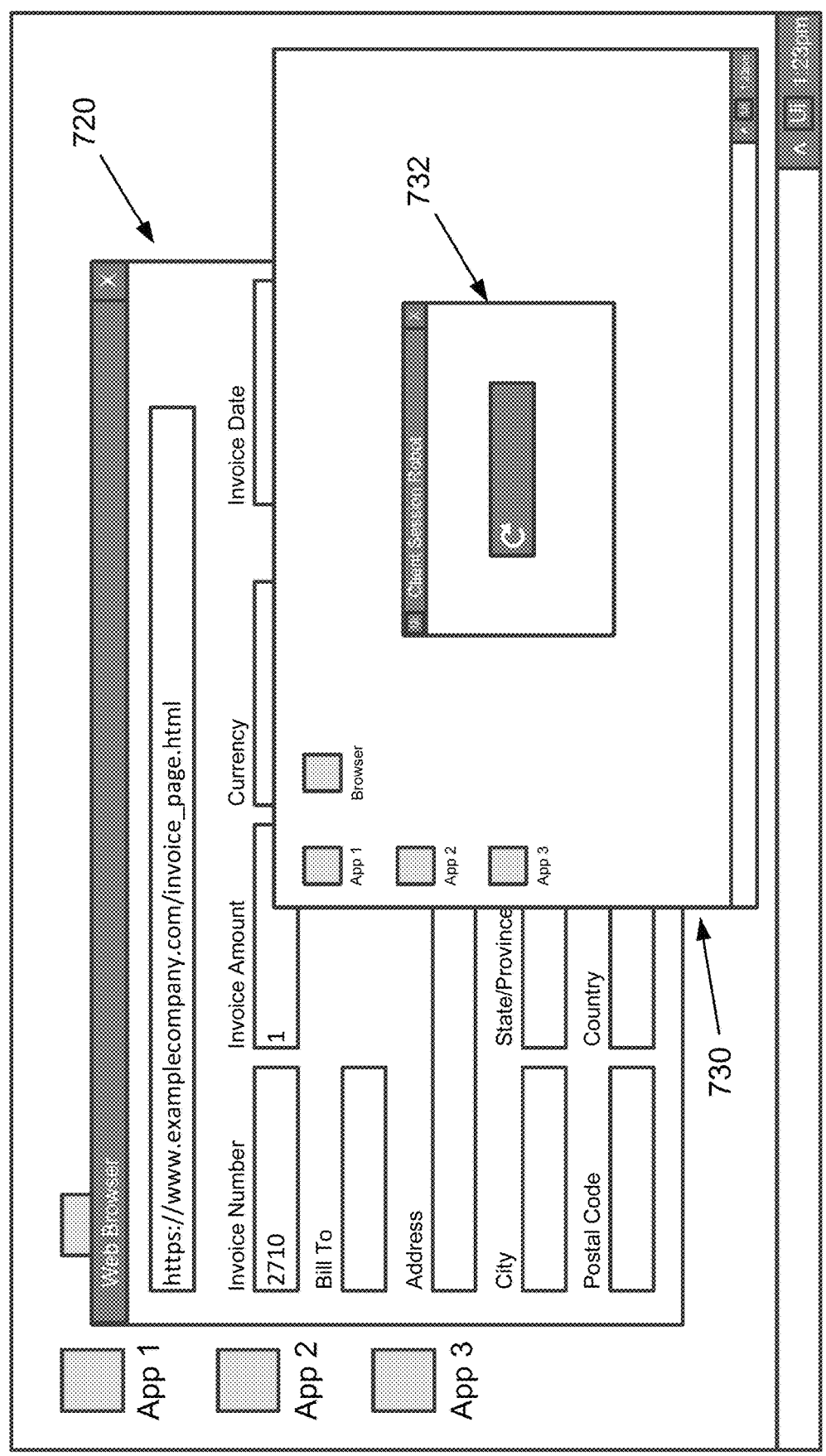

Turning to FIG. 7E, after the user clicks button 734, the robot begins filling out form fields in web page 720 by accessing and interacting with variables for the form fields of web page 720. For instance, the robot may change memory values for the fields stored in RAM, permanent local storage, a database, or any other storage type and/or location without deviating from the scope of the invention. In certain embodiments, the variables may be stored as part of the memory allocated for and used by the web application associated with web form 720.

The respective memory values changed by the robot cause the respective fields of web page 720 to be updated when web page 720 is refreshed. The associated text changed by the robot via the data modifications is visible to the user when web page 720 is not covered by another window or minimized. Unlike the example in FIGS. 6A-G, where RPA driver 640 manipulates the mouse and enters the text via API level and/or native mechanisms, data appears in the form fields of web page 720 without such interactions. While the robot completes the data interactions for the form, the user can interact with other applications and continue to be productive, or even interact with web page 720 itself in some embodiments, although the user's entries may be overwritten if the robot modifies data for the same field that the user entered information in.

Turning to FIG. 7F, after the robot completes its workflow, a message is displayed in window 732. As can be seen in the background, the robot has completed the data modifications for the respective memory variables associated with the form fields, and the new entries for the form fields are visible in web page 720 after it refreshes. The user may then close out robot session window 730, the robot may close robot session window 730 (and potentially the robot session itself) automatically, or robot session window 730 may stay open. The user may then submit the completed form. See FIG. 7G.

In some embodiments, the robot session may be a child session, and the child session may be created via a child session API of the operating system. Windows® Terminal Services Child Sessions or another child session API provided by an operating system may be used in some embodiments to create the second session without deviating from the scope of the invention. The robot tray application (e.g., the UiPath® Robot Agent Desktop) or another application configured to launch robot(s) may then use the create process APIs in the operating system with the appropriate arguments to start the robot process in that child session. The robot tray application or other suitable application may then communicate with the robot process using a suitable protocol (e.g., one built on named pipes).

FIG. 8 is a flowchart illustrating a process 800 for automation of a process running in a user session via an RPA robot running in a robot session, an IPC facilitator, and an RPA driver, according to an embodiment of the present invention. The process begins with launching a user session window at 810. This may be the main window associated with the operating system running on the user computing system, for example. A robot session window is then launched as a child window of the user session window at 820. In some embodiments, the robot session window may be launched responsive to the robot being initiated or otherwise launched, for example. The robot is then initiated in the robot session at 830.

The robot is executed at 840 and communicates with an IPC facilitator via IPC. The IPC facilitator may receive status notifications, retrieved data, error messages, commands, or other communications from the robot via IPC. The IPC facilitator may also send messages to the robot (such as commands, status updates, error messages from the IPC facilitator or RPA driver, etc.).

Using the data retrieved from the robot, the RPA facilitator controls or otherwise causes the RPA driver to perform application interactions using the retrieved data and/or other communications from the robot at 850. For instance, the RPA driver may be caused to move the mouse, click on fields, enter text, click a button, navigate a menu, open or close and application or window, etc. After the robot completes its execution, the robot session may be ended and the robot session window may be closed automatically in some embodiments at 860.

Figure 9:
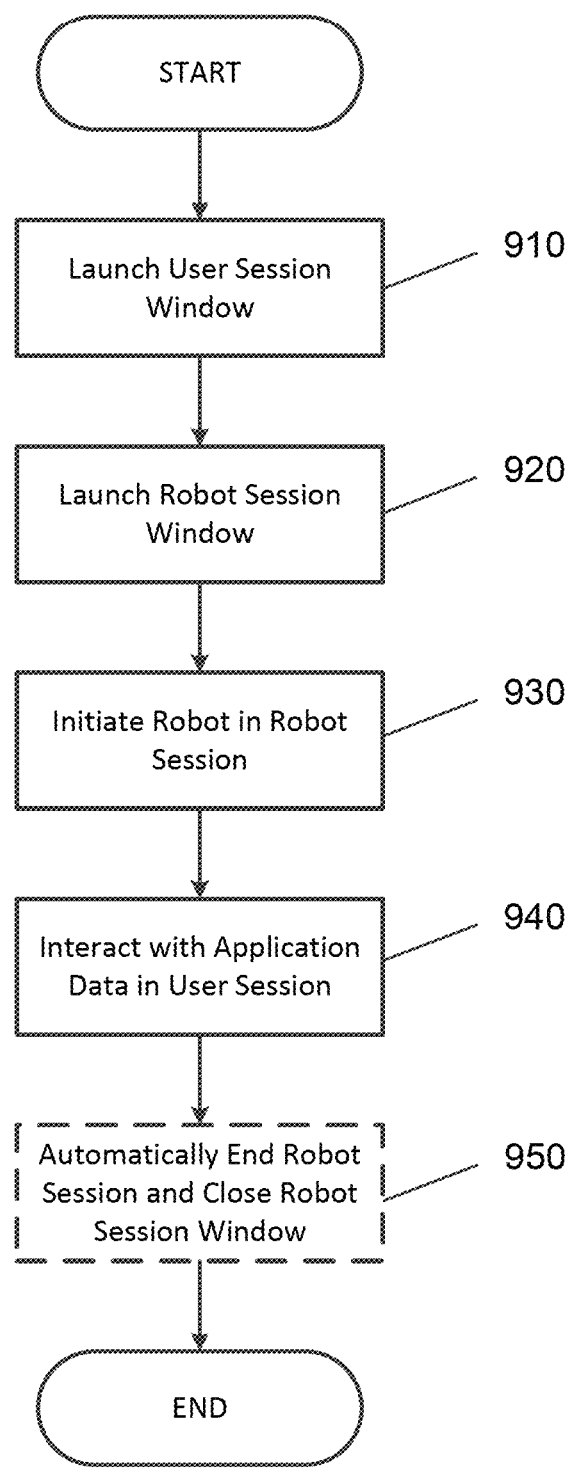
FIG. 9 is a flowchart illustrating a process for automation of a process running in a user session via an RPA robot running in a robot session via direct variable modification, according to an embodiment of the present invention.

FIG. 9 is a flowchart illustrating a process 900 for automation of a process running in a user session via an RPA robot running in a robot session via direct variable modification, according to an embodiment of the present invention. The process begins with launching a user session window at 910. This may be the main window associated with the operating system running on the user computing system, for example. A robot session window is then launched as a child window of the user session window at 920. In some embodiments, the robot session window may be launched responsive to the robot being initiated or otherwise launched, for example. The robot is then initiated in the robot session at 930 and the robot interacts with data associated with application(s) (e.g., web pages, spreadsheets, ERP applications, sales applications, etc.) running in the user session from the robot session at 940. For instance, the robot may create, change, or delete stored information in computing system memory to cause the changes to occur in the common stored data, which is accessed and used by the application(s) in the user session. After the robot completes its execution, the robot session may be ended and the robot session window may be closed automatically in some embodiments at 950.

In some embodiments, multiple running automation processes (e.g., UI automation processes) may be isolated in the client session. This may allow these processes to be called on demand from the main session via IPC, for example. In this manner, multiple RPA robot processes may be available on demand to be called from a main session application, a main session RPA robot, another client session RPA robot, etc. RPA robots running in the client session may also be able to collect data from the main session. In certain embodiments, RPA robots running in the client session may wait for a certain trigger from the main session before they perform their automation or part of an automation.

Figure 10:
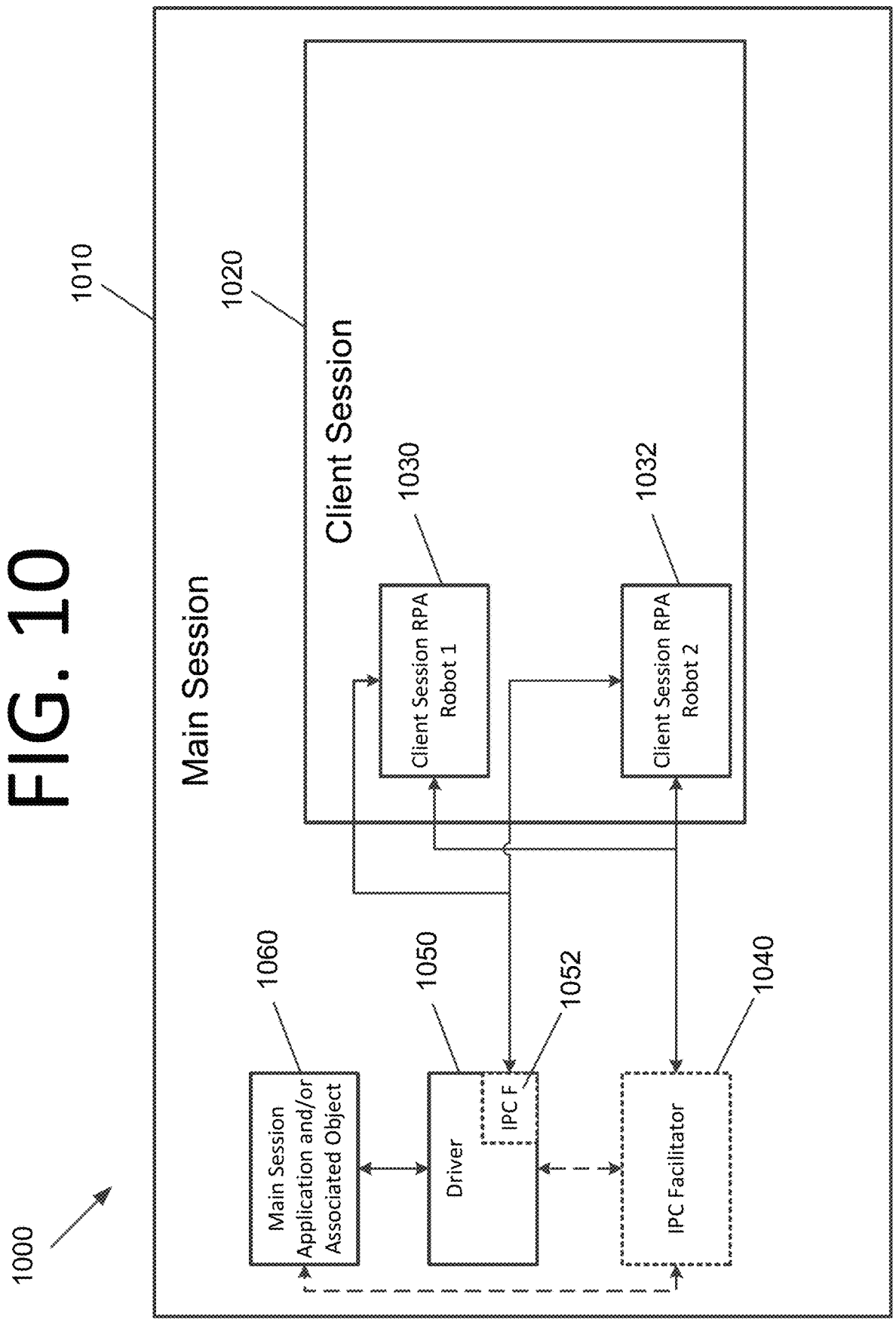
FIG. 10 illustrates an example of multiple client session RPA robots interacting with a main session application, according to an embodiment of the present invention.

FIG. 10 is an architectural diagram 1000 illustrating an example of multiple client session RPA robots interacting with a main session application, according to an embodiment of the present invention. In FIG. 10, a main session 1010 and a client session 1020 are running. Client session 1020 includes client session RPA robot 1 1030 and client session RPA robot 2 1032.

Client session RPA robots 1030, 1032 communicate with a separate IPC facilitator application 1040 or embedded RPA facilitator process or subroutine 1052 that is part of driver 1050. In some embodiments, driver 1050 may be driver 340 of FIG. 3, for example. IPC facilitator 1040 or 1052 causes driver 1050 to interact with a main session application and/or an associated application object 1060 (e.g., a Component Object Model (COM) object for a Microsoft Windows® application) in the manner dictated by the respective workflow logic of client session RPA robot 1030 or 1032. For instance, driver 1050 may be caused to move a mouse, fill out form data, click one or more buttons, interact with a menu, a combination thereof, etc. in main session application 1060. In certain embodiments, RPA facilitator application 1040 may communicate with main session application and/or associated application object 1060 directly.

In certain embodiments, RPA robots running in the client session may be attended automation robots. For instance, an RPA robot running in the client session may ask for input from a user in the main session. This may be accomplished via IPC with a main session robot, a driver, etc.

Figure 11:
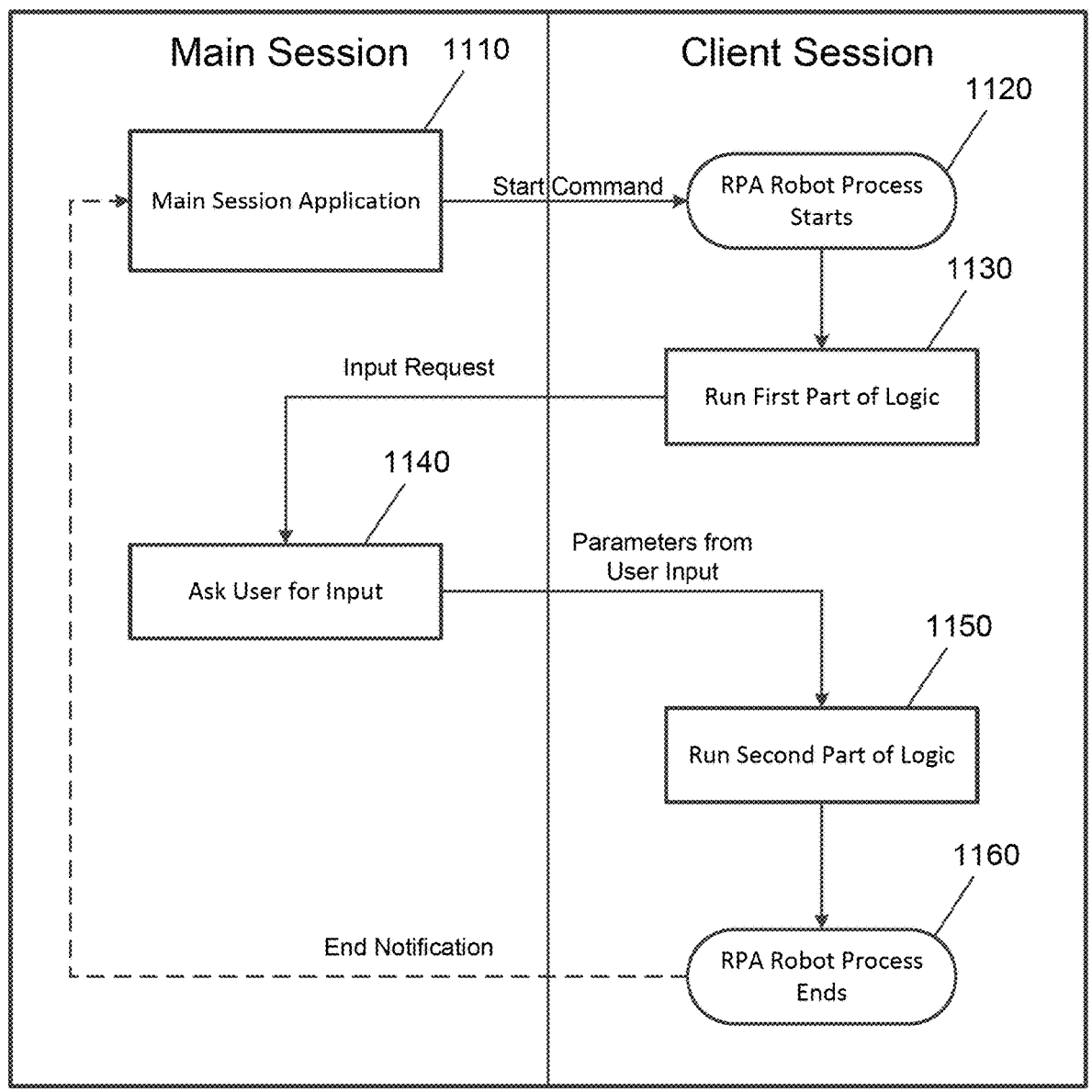
FIG. 11 is a flow diagram illustrating a process for running an attended automation RPA robot in a client session, according to an embodiment of the present invention.

FIG. 11 is a flow diagram 1100 illustrating a process for running an attended automation RPA robot in a client session, according to an embodiment of the present invention. In this embodiment, the user utilizes a main session application 1110 that causes a client session RPA robot process to start via IPC at 1120. In some embodiments, main session application 1110 may be an RPA assistant application that allows a user in the main session to interact with the attended RPA robot in the client session. For example, a dashboard of the RPA assistant application may show the current RPA processes supported by the robot, and the user can select a process to be executed. In certain embodiments, the RPA assistant application may display the steps of the client session workflow and/or execution status while the client session RPA robot is running.

After the client session RPA robot starts at 1120, the client session RPA robot runs a first part of its logic at 1130. After execution of the first part of the logic at 1130, the client session RPA robot asks for user input at 1140. This can occur via a message in an application running in the main session that appears via an IPC facilitator and driver interacting with the main session application, a message from an RPA robot running in the main session, etc. The user then provides the requested input, which is sent to the client session RPA robot via IPC, and the second part of the logic is executed at 1150 using this input. After the client session RPA robot process ends at 1160, main session application 1110 may receive a notification that the RPA robot process has ended.

In certain embodiments, parts of an automation may be run in the main session and other parts of the automation may be run in the client session. For instance, a main session application or RPA robot may perform certain operations in the main session and then cause an RPA robot running in the client session to execute another part of the automation when the main session application or robot reaches a certain point in its execution, receives a trigger, a logical condition is satisfied, etc. The client session RPA robot can perform its part of the automation sequentially or in parallel with the main session application or robot. The client session RPA robot can then provide an indication, requested data, execution results, etc. to the main session application or robot.

Figure 12:
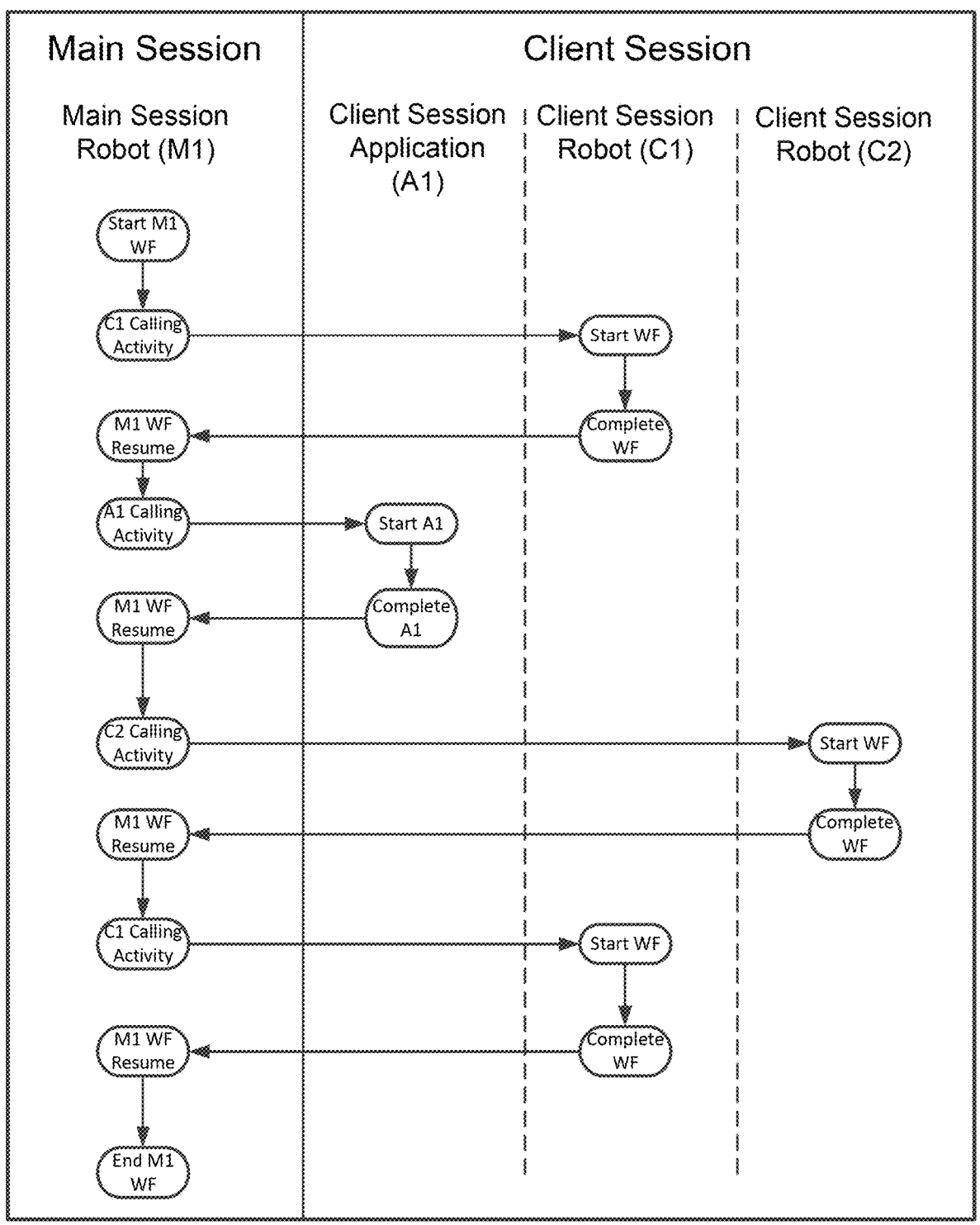
FIG. 12 is a flow diagram illustrating execution of a multi-robot collective workflow between a main session robot M1, a client session application A1, and a pair of client session robots C1 and C2, according to an embodiment of the present invention.

FIG. 12 is a flow diagram 1200 illustrating execution of a multi-robot collective workflow between a main session robot M1, a client session application A1, and a pair of client session robots C1 and C2, according to an embodiment of the present invention. A1, C1, and/or C2 may be in the same client session or different client sessions. M1 begins executing its workflow and reaches an activity that calls for C1 to complete a workflow. This may be performed by an "invoke workflow" activity that has a flag set to execute the RPA process in the client session in some embodiments. M1 causes C1 to execute its workflow via IPC and the calling activity waits. During this time, M1 may perform other tasks in some embodiments.

After C1 completes its workflow, C1 notifies M1 via IPC, and M1 resumes execution until it reaches an activity that calls for A1, which is a process in the client session, to begin executing or to complete a task. M1 causes A1 to execute and/or to perform a task via IPC and the calling activity (e.g., an "invoke process" activity) waits. An invoke process activity may have a flag set to execute A1 in the client session in some embodiments. Once again, M1 may perform other tasks while waiting for A1 in some embodiments.

After A1 completes its process or task, A1 notifies M1 via IPC, and M1 resumes execution until it reaches an activity that calls for C2 to complete a workflow. M1 causes C2 to execute its workflow via IPC and the calling activity waits. Once again, M1 may perform other tasks while waiting for C2 in some embodiments.

After C2 completes its workflow, M1 is notified via IPC and resumes execution until it reaches an activity that once again calls for C1 to complete a workflow. This may be the same workflow activities as previously executed or a different workflow or set of activities. M1 causes C1 to execute its workflow via IPC and the calling activity waits. Yet again, M1 may perform other tasks while waiting for C1 in some embodiments. After C1 completes its workflow, M1 is notified via IPC resumes execution until the workflow of M1 is completed. In certain embodiments, C1 may remain running after being initially invoked and may still be running when called again by M1.

Per the above, in some embodiments, M1 may include one or more "invoke workflow" activities and/or an "invoke process" activities that may invoke RPA robot(s) (e.g., C1 and/or C2) and/or other processes (e.g., A1) in the client session. Such an activity may start the respective RPA robot(s) and/or process(es), communicate with RPA robot(s) and/or process(es) that are already running, etc. These activities may be created when an RPA developer develops the workflow for M1. In certain embodiments, RPA robot(s) may invoke RPA robots and/or processes from the client session into the main session via an RPA facilitator or other suitable functionality.

During execution, M1 may communicate with A1, C1, and C2 via IPC, and vice versa. For instance, M1 may send comments and requests to A1, C1, and C2, M1 may receive status messages, results, and error messages from A1, C1, and C2, etc. In this manner, M1 may act as a main RPA robot that controls client session RPA robots and/or other processes (e.g., applications) in the client session. In certain embodiments, M1, A1, C1, and/or C2 may operate in parallel.

Figure 13:
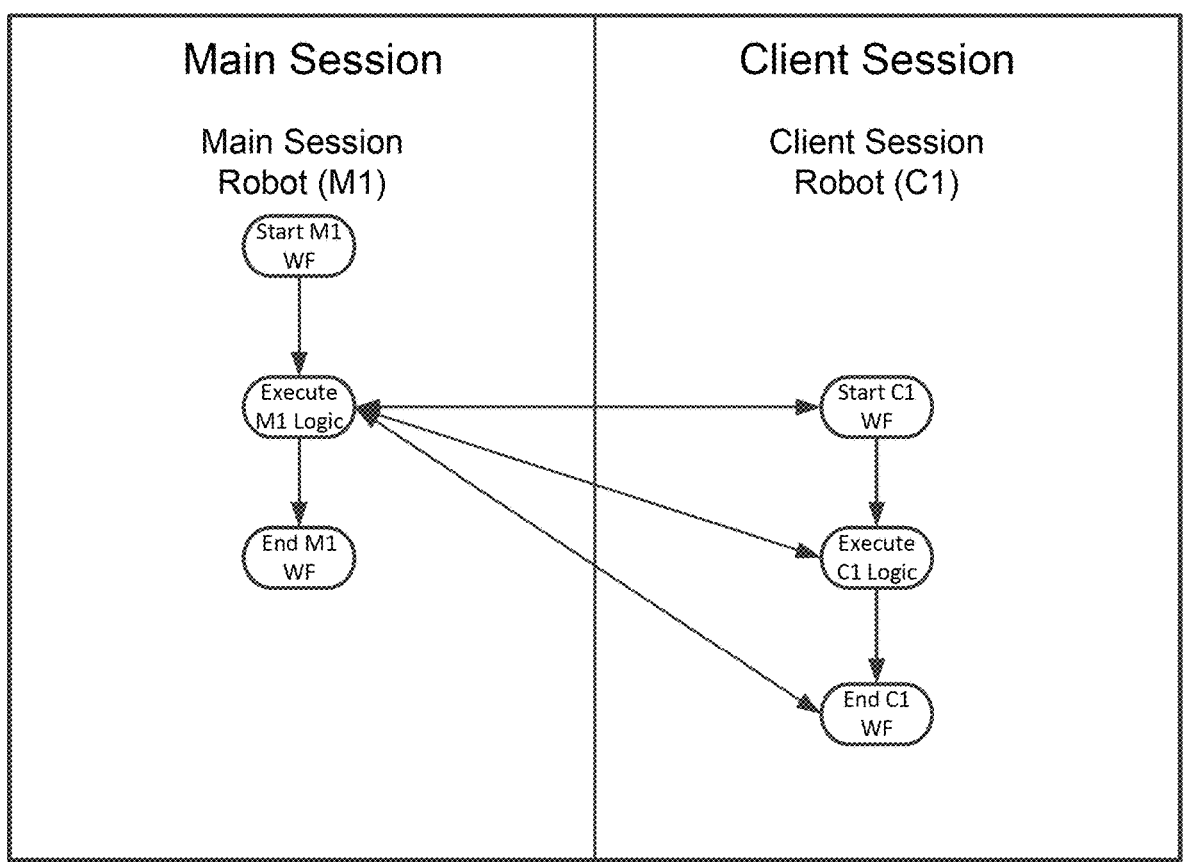
FIG. 13 is a flow diagram illustrating execution of a main session RPA robot and a client session RPA robot in parallel, according to an embodiment of the present invention.

In some embodiments, M1 may perform all interactions with applications running in the main session, which may eliminate the need for an IPC facilitator. Thus, C1 and C2 may perform various data retrieval and processing tasks and M1 may perform UI interaction tasks. In certain embodiments, at least some workflow activities of M1, C1, and/or C2 may be executed in parallel. One such example is shown in flow diagram 1300 of FIG. 13, where C1 is executed based on the logic of M1 and execution occurs in parallel. Communications may be sent between M1 and C1 during the section of C1. However, in certain embodiments, C1 may complete its execution independently, and may complete execution of its workflow after M1 ends.

In some embodiments, all RPA robot activities run in the client session. RPA robots may be called from the main session by a robot executor, for instance, such as the UiPath® robot tray, an IPC facilitator, another application, etc. Results of the execution of the RPA robots and other communications could be provided to the robot executor or other application via IPC.

In certain embodiments, a standardized communication format may be used for IPC communications between the client session and the main session. For instance, main session and client session processes may exchange XAML data. This helps to ensure that communications are in a format that the respective processes can recognize.

In some embodiments, IPC may be used between RPA processes running in the same session for synchronization purposes. For instance, multiple RPA processes may run in parallel in the background with a foreground process in a main session. IPC may provide a synchronization mechanism to exchange information between the background processes and the foreground or main process.

In certain embodiments, the driver (e.g., driver 340 of FIG. 3) will be loaded in a main RPA workflow process. The communication between the child RPA process and the main RPA workflow process may occur via IPC. This allows the main RPA workflow process to utilize the driver to carry out operations for the client session robot based on IPC information.

In some embodiments, a client session RPA robot may work with applications open in the main session. For instance, a client session RPA robot may work with an Excel® spreadsheet open in the main session. This can occur via IPC between the client session RPA robot and an RPA facilitator, for example. The RPA facilitator may cause the driver to carry out the interaction(s) with the Excel® spreadsheet based on information provided by the client session RPA robot (e.g., entering data into a spreadsheet, modifying table values, etc.). In certain embodiments, activities may be included in an RPA workflow that automatically capture application data between both sessions (e.g., Microsoft Office® activities, web browser activities, etc.). In this manner, the client session RPA robot essentially works with applications running in the main session as if they are running in the RPA robot's own session. Indeed, in some embodiments, an RPA developer may not be aware that workflows or parts thereof that he or she is developing will be executed in the client session.

In certain embodiments, when designing an RPA robot using a designer application, for example, the RPA developer may set a client session flag on an "invoke workflow" activity or an "invoke process" activity. The invoke workflow activity invokes an RPA workflow. The invoke process activity executes a process that is available for the local machine. Setting this flag may cause the RPA workflow or process to be invoked in the client session rather than the main session.

Figure 14:
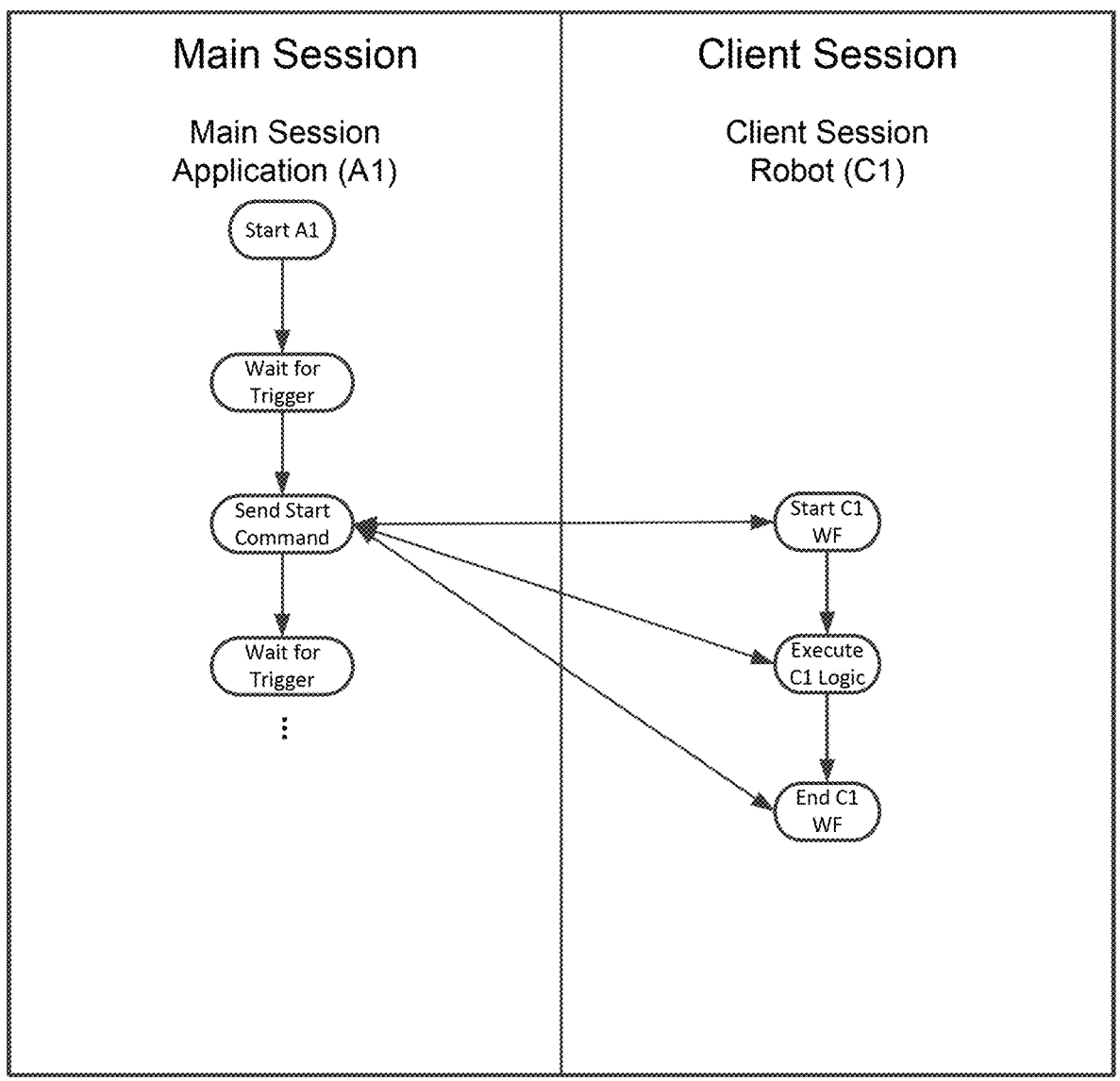
FIG. 14 is a flow diagram illustrating execution of a client session RPA robot based on a trigger for a main session application, according to an embodiment of the present invention.

In some embodiments, the execution of the client session RPA robot may be based on a trigger from a main session application and/or RPA robot. FIG. 14 is a flow diagram 1400 illustrating execution of a client session RPA robot based on a trigger for a main session application, according to an embodiment of the present invention. A main session application A1 (which may be an RPA robot in some embodiments) begins executing and waits for a trigger. After the trigger is received, A1 starts execution of a client session RPA robot C1 via IPC. Communications may be sent between A1 and C1 during the section of C1. A1 then waits for another trigger and C1 executes its workflow.

Figure 15:
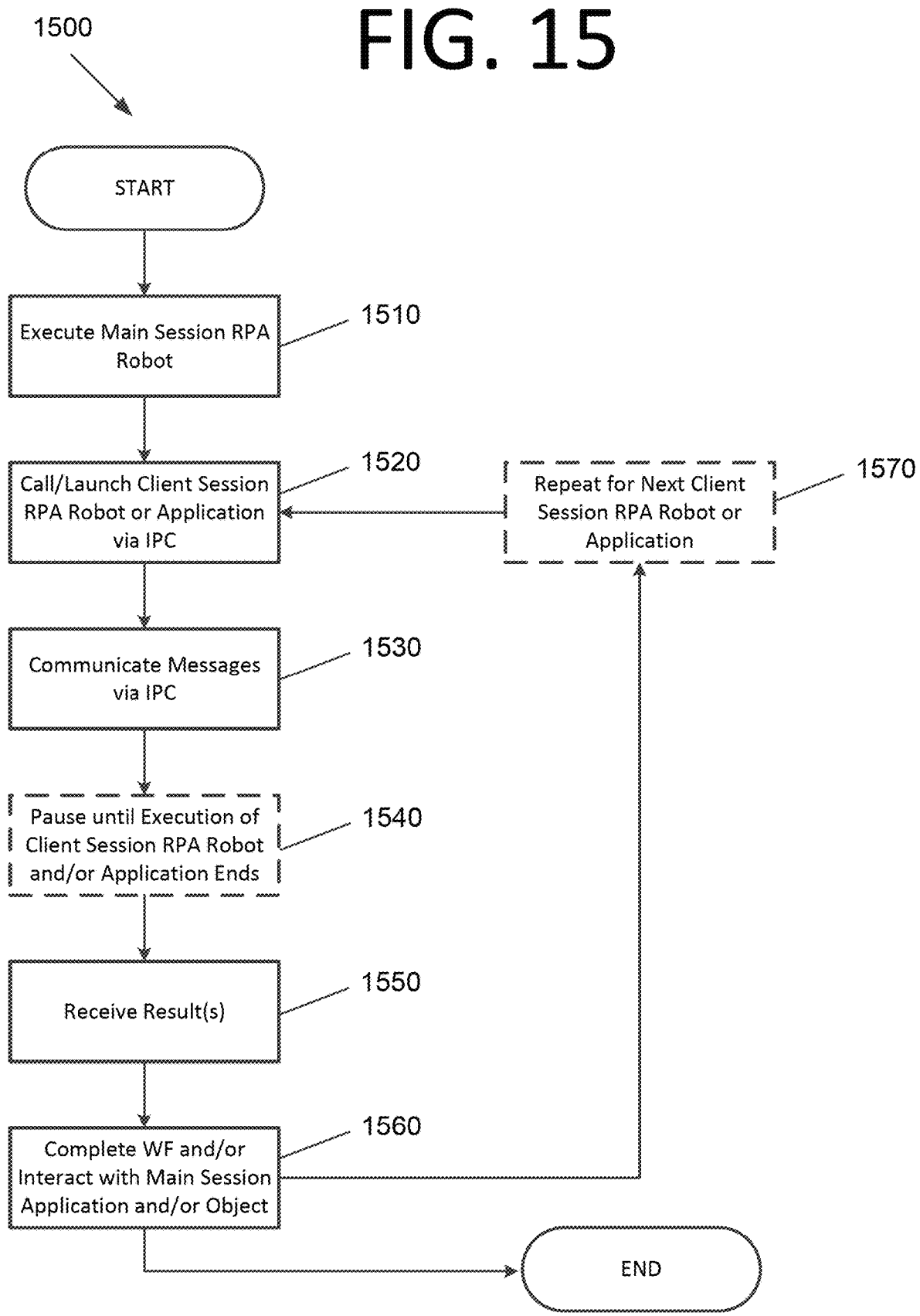
FIG. 15 is a flowchart illustrating a process for performing inter-session automation, according to an embodiment of the present invention.

FIG. 15 is a flowchart illustrating a process 1500 for performing inter-session automation, according to an embodiment of the present invention. The process begins with executing an RPA robot in a main session of a computing system at 1510. an RPA robot or an application is called or launched in a client session via IPC by the main session RPA robot at 1520. Messages are communicated between the client session RPA robot or application and the main session RPA robot via IPC at 1530. In some embodiments, the main session RPA robot pauses its execution until the execution of the client session RPA robot or application ends at 1540.

Result(s) of the execution of the client session RPA robot or application are received via IPC by the main session RPA robot at 1550. The main session RPA robot then uses the result(s) at 1560 to complete at least a portion of the workflow of the main session RPA robot, to interact with an application or application object running in the main session, or both. In some embodiments, the process is repeated for the next client session RPA robot or client session application at 1570, and the process returns to step 1520.

In some embodiments, the client session RPA robot, the client session application, or both, are called or launched two or more times in the workflow of the main session RPA robot. In certain embodiments, the client session application is called or launched via an invoke process activity of the workflow of the main session RPA robot, the client session RPA robot is called or launched via an invoke workflow activity of the workflow of the main session RPA robot, or both. In some embodiments, the invoke process activity comprises a flag indicating that the client session application is run in the client session, the invoke workflow activity comprises a flag indicating that the client session RPA robot is run in the client session, or both. In certain embodiments, the client session application, the client session RPA robot, or both, continue running after providing the results. In some embodiments, the IPC communications between the main session RPA robot and the client session RPA robot and/or client session application are in a standardized communication format.

The process steps performed in FIGS. 8-15 may be performed by a computer program, encoding instructions for the processor(s) to perform at least part of the process(es) described in FIGS. 8-15, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 8-15, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
receiving one or more messages from a robotic process automation (RPA) robot running in a second session via IPC, by an inter-process communication (IPC) facilitator running in a first session; and
controlling an RPA driver running in the first session to interact with an application or application object also running in the first session, by the IPC facilitator, based on the received one or more messages from the RPA robot.

2. The computer-implemented method of claim 1, wherein the IPC facilitator is a subprocess of the RPA driver.

3. The computer-implemented method of claim 1, wherein the IPC facilitator is configured with a script for interacting with the RPA robot and for controlling the RPA driver.

4. The computer-implemented method of claim 1, further comprising:
directly modifying variables stored in memory on a computing system, by the RPA robot, wherein
the variables are associated with the application or the application object running in the first session.

5. The computer-implemented method of claim 4, wherein the variables stored in the memory are allocated for and used by the application or the application object running in the first session.

6. The computer-implemented method of claim 4, wherein when the application is running in the first session, the application is configured to access the variables stored in the memory when a display of the computing system refreshes or the application otherwise reloads a user interface (UI).

7. The computer-implemented method of claim 1, further comprising:
pausing operation of the RPA robot when the application is not currently running, via the IPC facilitator;
launching the application, by the IPC facilitator controlling the RPA driver; and
resuming operation of the RPA robot after the application is launched, via the IPC facilitator.

8. The computer-implemented method of claim 1, wherein the one or more messages from the RPA robot to the IPC facilitator comprise status notifications, retrieved data, error messages, commands, or a combination thereof.

9. The computer-implemented method of claim 1, wherein the IPC facilitator is configured to listen for IPC messages from the RPA robot, send communications to and receive communications from the RPA robot, monitor an execution status of the RPA robot, or any combination thereof.

10. The computer-implemented method of claim 1, wherein the IPC facilitator is custom designed to implement functionality to be performed in the first session.

11. A non-transitory computer-readable medium storing a computer program, the computer program configured to cause at least one processor to:
receive one or more messages from a robotic process automation (RPA) robot running in a second session via IPC; and
control an RPA driver running in the first session to interact with an application or application object also running in the first session and implement functionality in the first session, by the IPC facilitator, based on the received one or more messages from the RPA robot.

12. The non-transitory computer-readable medium of claim 11, wherein the IPC facilitator is a subprocess of the RPA driver.

13. The non-transitory computer-readable medium of claim 11, wherein the IPC facilitator is configured with a script for interacting with the RPA robot and for controlling the RPA driver.

14. The non-transitory computer-readable medium of claim 11, wherein the computer program is further configured to cause the at least one processor to:
directly modify variables stored in memory on a computing system, by the RPA robot, wherein
the variables are associated with the application or the application object running in the first session.

15. The non-transitory computer-readable medium of claim 11, wherein the computer program is further configured to cause the at least one processor to:
pause operation of the RPA robot when the application is not currently running, via the IPC facilitator;
launch the application, by the IPC facilitator controlling the RPA driver; and
resume operation of the RPA robot after the application is launched, via the IPC facilitator.

16. The non-transitory computer-readable medium of claim 11, wherein the one or more messages from the RPA robot to the IPC facilitator comprise status notifications, retrieved data, error messages, commands, or a combination thereof.

17. The non-transitory computer-readable medium of claim 11, wherein the IPC facilitator is configured to listen for IPC messages from the RPA robot, send communications to and receive communications from the RPA robot, monitor an execution status of the RPA robot, or any combination thereof.

18. The non-transitory computer-readable medium of claim 11, wherein the IPC facilitator is custom designed to implement the functionality to be performed in the first session.

19. A computing system, comprising:
memory storing computer program instructions; and
at least one processor configured to execute the computer program instructions, wherein the computer program instructions are configured to cause the at least one processor to:
receive one or more messages from a robotic process automation (RPA) robot running in a second session via IPC; and
control an RPA driver running in the first session to interact with an application or application object also running in the first session and implement functionality in the first session, by the IPC facilitator, based on the received one or more messages from the RPA robot, wherein
the IPC facilitator is configured to listen for IPC messages from the RPA robot, send communications to and receive communications from the RPA robot, monitor an execution status of the RPA robot, or any combination thereof.

20. The computing system of claim 19, wherein the IPC facilitator is a subprocess of the RPA driver.

21. The computing system of claim 19, wherein the IPC facilitator is configured with a script for interacting with the RPA robot and for controlling the RPA driver.

22. The computing system of claim 19, wherein the computer program instructions are further configured to cause the at least one processor to:
directly modify variables stored in memory on a computing system, by the RPA robot, wherein
the variables are associated with the application or the application object running in the first session.

23. The computing system of claim 19, wherein the computer program instructions are further configured to cause the at least one processor to:
pause operation of the RPA robot when the application is not currently running, via the IPC facilitator;
launch the application, by the IPC facilitator controlling the RPA driver; and
resume operation of the RPA robot after the application is launched, via the IPC facilitator.

24. The computing system of claim 19, wherein the IPC facilitator is custom designed to implement the functionality to be performed in the first session.

* * * * *